US009256524B2

(12) United States Patent  (10) Patent No.: US 9,256,524 B2
Kano et al.  (45) Date of Patent: Feb. 9, 2016

(54) STORAGE SYSTEM HAVING A THIN PROVISIONING FUNCTION

(71) Applicant: HITACHI, LTD., Tokyo (JP)

(72) Inventors: Yoshiki Kano, Sunnyvale, CA (US); Akira Yamamoto, Kanagawa-ken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/723,648

(22) Filed: Dec. 21, 2012

(65) Prior Publication Data

US 2013/0117523 A1 May 9, 2013

Related U.S. Application Data

(63) Continuation of application No. 12/694,695, filed on Jan. 27, 2010, now abandoned, which is a continuation of application No. 11/604,090, filed on Nov. 22, 2006, now abandoned, which is a continuation of application No. 11/093,604, filed on Mar. 29, 2005, now Pat. No. 7,162,600.

(51) Int. Cl.
*G06F 12/00* (2006.01)
*G06F 13/00* (2006.01)
*G06F 13/28* (2006.01)
(Continued)

(52) U.S. Cl.
CPC .......... *G06F 12/0223* (2013.01); *G06F 3/0605* (2013.01); *G06F 3/067* (2013.01); *G06F 3/0608* (2013.01); *G06F 3/0644* (2013.01); *G06F 3/0647* (2013.01); *G06F 11/2087* (2013.01)

(58) Field of Classification Search
CPC ..... G06F 3/0665; G06F 3/0631; G06F 12/02; G06F 3/0644

USPC .................................................. 711/112, 162
See application file for complete search history.

(56) References Cited

U.S. PATENT DOCUMENTS 5,522,037 A   5/1996  Kitagawa et al.
5,956,750 A   9/1999  Yamamoto et al.
(Continued)

FOREIGN PATENT DOCUMENTS

EP        1357465     10/2003
EP        1357476     10/2003
(Continued)

OTHER PUBLICATIONS

Microsoft Computer Dictionary, 5th edition, Microsoft Press, Copyrgt. 2002, p. 61.
(Continued)

*Primary Examiner* — Charles Rones
*Assistant Examiner* — Sidney Li
(74) *Attorney, Agent, or Firm* — Mattingly & Malur, PC

(57) ABSTRACT

A storage system, coupled to an external storage system, manages a virtual volume, such as a thin provision volume. The storage system also manages a first logical device created by using storage area of internal storage devices and a second logical device created by using storage area of external storage devices in the external storage system. A storage area in the first logical device or the second logical device is allocated to the virtual volume after receiving a write request to the virtual volume. The storage system has advantage that a storage area in the first logical device and the second logical device can be managed uniformly in thin provisioning function of the storage system.

29 Claims, 20 Drawing Sheets

(51) Int. Cl.
  *G06F 12/02* (2006.01)
  *G06F 3/06* (2006.01)
  *G06F 11/20* (2006.01)

(56) References Cited

U.S. PATENT DOCUMENTS

| | | | |
|---|---|---|---|
| 6,182,089 B1 | 1/2001 | Ganapathy | |
| 6,606,682 B1 | 8/2003 | Dang et al. | |
| 6,654,830 B1 | 11/2003 | Taylor et al. | |
| 6,725,328 B2 | 4/2004 | Kano et al. | |
| 6,732,171 B2 | 5/2004 | Hayden | |
| 6,804,755 B2 | 10/2004 | Selkirk et al. | |
| 6,823,442 B1 | 11/2004 | Cameron | |
| 6,874,092 B1 | 3/2005 | Motoyama et al. | |
| 7,130,960 B1 | 10/2006 | Kano | |
| 7,162,600 B2 | 1/2007 | Kano et al. | |
| 7,200,664 B2 | 4/2007 | Hayden | |
| 7,441,095 B2 | 10/2008 | Tamura et al. | |
| 7,447,832 B2 | 11/2008 | Kano et al. | |
| 7,577,817 B2 | 8/2009 | Karpoff et al. | |
| 7,941,630 B2 | 5/2011 | Eguchi | |
| 2002/0112113 A1* | 8/2002 | Karpoff et al. | 711/4 |
| 2003/0009619 A1 | 1/2003 | Kano et al. | |
| 2003/0140210 A1 | 7/2003 | Testardi | |
| 2003/0145167 A1 | 7/2003 | Tomita | |
| 2003/0204597 A1 | 10/2003 | Arakawa et al. | |
| 2003/0237019 A1 | 12/2003 | Kleiman et al. | |
| 2004/0008554 A1 | 1/2004 | Kanamori et al. | |
| 2004/0044827 A1 | 3/2004 | Carlson | |
| 2004/0044860 A1* | 3/2004 | Gibble et al. | 711/160 |
| 2004/0230766 A1 | 11/2004 | Cameron | |
| 2005/0033915 A1 | 2/2005 | Matsunami et al. | |
| 2005/0055603 A1 | 3/2005 | Soran et al. | |
| 2005/0060507 A1* | 3/2005 | Kasako et al. | 711/162 |
| 2005/0071379 A1 | 3/2005 | Kekre et al. | |
| 2005/0071559 A1 | 3/2005 | Tamura et al. | |
| 2005/0108292 A1 | 5/2005 | Burton et al. | |
| 2005/0182890 A1 | 8/2005 | Yamagami | |
| 2005/0198450 A1 | 9/2005 | Corrado et al. | |
| 2005/0210210 A1 | 9/2005 | Arai et al. | |
| 2006/0047909 A1 | 3/2006 | Takahashi et al. | |
| 2006/0059308 A1* | 3/2006 | Uratani et al. | 711/114 |
| 2006/0085471 A1 | 4/2006 | Rajan et al. | |
| 2006/0136691 A1 | 6/2006 | Brown et al. | |
| 2006/0153192 A1 | 7/2006 | Pohlabel et al. | |
| 2006/0224844 A1 | 10/2006 | Kano et al. | |
| 2006/0242378 A1 | 10/2006 | Kano | |
| 2007/0067588 A1 | 3/2007 | Kano et al. | |
| 2011/0047344 A1 | 2/2011 | Eguchi | |
| 2011/0179263 A1 | 7/2011 | Eguchi | |

FOREIGN PATENT DOCUMENTS

| | | |
|---|---|---|
| JP | 7-84728 A | 3/1995 |
| JP | 2003-15915 A | 1/2003 |
| JP | 2003015915 | 1/2003 |
| JP | 2003316522 | 11/2003 |
| JP | 2005-107645 A | 4/2005 |

OTHER PUBLICATIONS

G. Hough et al., 3PAR Thin Provisioning Eliminating Allocated-But-Unused Storage and Accelerating ROI, 3PAR Proprietary, Jun. 2003, pp. 1-14, 3PARdata, Inc., Fremont, CA.

Geoffrey Hough, "3PAR Thin Provisioning, Eliminating Allocated—But—Unused Storage and Accelerating ROI", Jun. 2003, pp. 1-14.

* cited by examiner

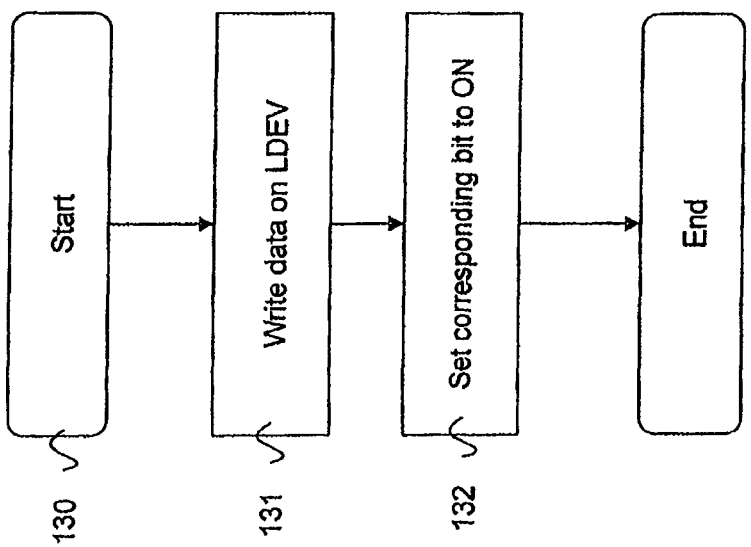

Allocated Segment for Virtual Device                    27-0

| VDEV | Size | Start VLBA | Segment Size | SEGMENT |
|---|---|---|---|---|
| 1 | 3TB | 0 | 2047 | 100 |
| | | 4096 | 2047 | 101 |
| | | ... | ... | ... |
| | | 20470 | 2047 | 300 |
| | | ... | ... | |
| 2 | 4TB | 2048 | 2047 | 291 |
| | | ... | ... | ... |
| ... | ... | ... | ... | ... |

| SEGMENT | LDEV | LBA | Segment Size |
|---|---|---|---|
| 301 | 200 | 22517 | 2047 |
| 302 | 200 | 24564 | 2047 |
| ... | .. | ... | .. |

FIG.6

|  | 171 | 172 | 173 | 174 |
|---|---|---|---|---|
|  | Size | Used LDEV | Free LDEV | Reserved LDEV |
|  | 3TB | 1,2,3,4,5, ... | 100,101,102, 103..109, ... | 10,11, ... |
|  | ... | ... | ... | ... |

28-0

| 81 | 82 | 83 | 84 |
|---|---|---|---|
| Port | WWN | LUN | DEV |
| 1 | 10.00.00.00.C9.36.07.D7 | 1 | L DEV 1 |
| 1 | 10.00.00.00.C9.36.07.D7 | 2 | L DEV 2 |
| 1 | 10.00.00.00.C9.36.07.D7 | 3 | L DEV 3 |
| ... | ... | ... | ... |
| 2 | 10.00.00.00.C9.36.07.01 | 1 | V DEV 10 |
| 2 | 10.00.00.00.C9.36.07.01 | 2 | V DEV 11 |
| 2 | 10.00.00.00.C9.36.07.01 | 3 | V DEV 12 |
| 2 | 10.00.00.00.C9.36.07.01 | 4 | V DEV 13 |
| ... | ... | ... | ... |
| ... | ... | ... | ... |
| ... | ... | ... | ... |

25

|   ⌐ 475    |   ⌐ 476        | ⌐ 477 ⌐ 28-1        |
|------------|----------------|---------------------|
| Used VDEV  | Reserved VDEV  | Free VDEV           |
| 1,2,3,4,5  | 90             | 100,101,102, 103..109 |

| LU 221 | LDEV# 222 | Current Config 223 | Recommendation 224 | Allocated/ Modified (%) 225 | Request Migration 226 |
|---|---|---|---|---|---|
| 1 | 1 | Normal | Normal | 40 | ☐ |
| 2 | 2 | Allocation on use | Normal | 60 | ☑ |
| : | : | : | : | : | : |

Cancel  Apply

FIG.20

Task management

Migrater creates a bitmap table for target device

| Parity Group | Size | RAID | Disk # | LDEV | Start LBA | End LBA |
|---|---|---|---|---|---|---|
| 231 | 232 | 233 | 234 | 235 | 236 | 237 |
| 1 | 1TB | RAID5 | 1,2,3,4 | 1 | 0 | 1073741823 |
| | | | | 2 | 1073741824 | 2147483647 |
| | | | | ... | ... | ... |
| 2 | 2TB | RAID1 | 10,11,12,13 | 10 | 0 | 2147483647 |
| | | | | ... | ... | ... |
| 3 | 1TB | RAID0 | Ex₂ | 20 | 0 | 4294967295 |
| | | | | ... | ... | ... |
| 4 | 1TB | RAID0 | Ex₃ | 40 | ... | ... |
| ... | ... | ... | ... | ... | ... | ... |

| Ex-LU | Size | WWN | LUN |
|---|---|---|---|
| 241 | 242 | 243 | 244 |
| 1 | 500GB | 10.00.00.00.C9.36.07.32 | 1 |
| 2 | 500GB | 10.00.00.00.C9.36.07.32 | 2 |
| 3 | 1TB | 10.00.00.00.C9.36.07.DF | 1 |
| ... | ... | ... | ... |

240

STORAGE SYSTEM HAVING A THIN PROVISIONING FUNCTION

CROSS-REFERENCES TO RELATED APPLICATIONS

This application is a continuation of U.S. patent application Ser. No. 12/694,695, filed on Jan. 27, 2012, which is a continuation of U.S. application Ser. No. 11/604,090, filed Nov. 22. 2006, now abandoned, which is a continuation of U.S. application Ser. No. 11/093.604, filed Mar. 29, 2005, now U.S. Pat. No. 7,162,600, which is related to commonly owned U.S. application Ser. No. 09/931,253, filed Aug. 17, 2001, now U.S. Pat. No. 6,725,328, the entire disclosures of which are herein incorporated by reference for all purposes.

BACKGROUND OF THE INVENTION

The invention is related to storage systems and in particular to migration in a allocation as needed (i.e., thin provisioned) storage system.

Allocation-on-use (allocation-as-needed, also referred to as "thin provisioning") technology provides an efficient storage space management for virtual volumes, since space is allocated on an as-needed basis. Conventional "manual provisioning" of storage involves installing the actual physical storage called for; e.g., if 10 terabytes (TB) of storage is required, then in a "manual provisioning" approach, 10 TB of storage is purchased and installed. Manually provisioned volumes are referred to herein as "normal volumes". Thin provisioning allows a user (e.g., administrator) to create volumes of any size without actually purchasing or installing the entire amount of disk storage. Thin provisioned volumes are referred herein as "thin provisioned volumes." A common use of thin provisioning is in virtual storage systems, where "virtual volumes" in the virtual storage are provided as thin provisioned volumes. Commonly owned U.S. Pat. No. 6,725, 328 shows an example of thin provisioning, referred to therein as allocation-on-use.

Current data migration technologies for volumes such as Logical Units (LUs) in the SCSI environment perform operations on a block-by-block basis irrespective of the data in the blocks. If we use the current migration technology for thin-provisioning technology, the benefits of thin provisioning will be lost because conventional migration technology copies all blocks in the source volume to the target volume. Consequently, even in a thin-provisioning system, all blocks would be allocated. Improvements in this area of storage technologies can be made.

As the amount of information treated in a computer system for use in companies, corporations, etc. is drastically increased, the capacity of a storage device such as a disk for storage of data has been increased steadily in these years. For example, a magnetic disk storage system having a capacity of the order of terabytes is very common. With respect to such a disk storage system, there is a technique by which a single storage device subsystem is made up of a plurality of types of logical disks (which will be sometimes referred to merely as disks), e.g., as disclosed in U.S. Pat. No. 5,956,750, incorporated herein by reference. Disclosed in the disclosure is, more specifically, a disk subsystem which is made up of disks having different RAID levels such as RAID5 and RAID1 as devices (logical disks) to be accessed by a host computer, or made up of disks having different access rates as actual magnetic disks (physical disks) of logical disks. A user can selectively use the devices according to the access rates of the respective devices.

SUMMARY OF THE INVENTION

The present invention provides a method to migrate between "normal volumes" and "virtual volume" while maintaining the benefits of thin-provisioning. Migration from a normal volume includes determining whether a data block contains production data. A data block which contains production data is identified as a segment in the thin provisioned volume. Those data blocks which do not contain production data are placed in a free segment list. Thereafter, data access can take place in the thin provisioned volume.

A further aspect of the present invention is migration of data from a thin provisioned volume to a normal volume. Each segment allocated to the thin provisioned volume is copied to a corresponding location in the normal volume according to the logical block address associated with the segment.

A further aspect of the present invention is creation of a normal volume having a bitmap to understand the modification of blocks within a volume. The volume is used on migration from normal volume to virtual volume.

BRIEF DESCRIPTION OF THE DRAWINGS

Aspects, advantages and novel features of the present invention will become apparent from the following description of the invention presented in conjunction with the accompanying drawings, wherein:

FIG. 3 shows information for defined parity groups;

FIG. 4 shows processing for SCSI write operations;

FIG. 5 shows configuration information for a thin provisioned volume;

FIG. 6 shows information for a free segment pool for thin provisioned volumes;

FIG. 20 shows an example of an interface for recommending migrations;

DESCRIPTION OF THE SPECIFIC EMBODIMENTS

The first embodiment shows the migration from a Logical DEVice (LDEV) which is a volume comprising blocks of data on one or more physical devices to a Virtual DEVice (VDEV) which comprises on-demand allocated segments, or from VDEV to LDEV on host's initial write using allocation-on-use technology.

Figure 1:
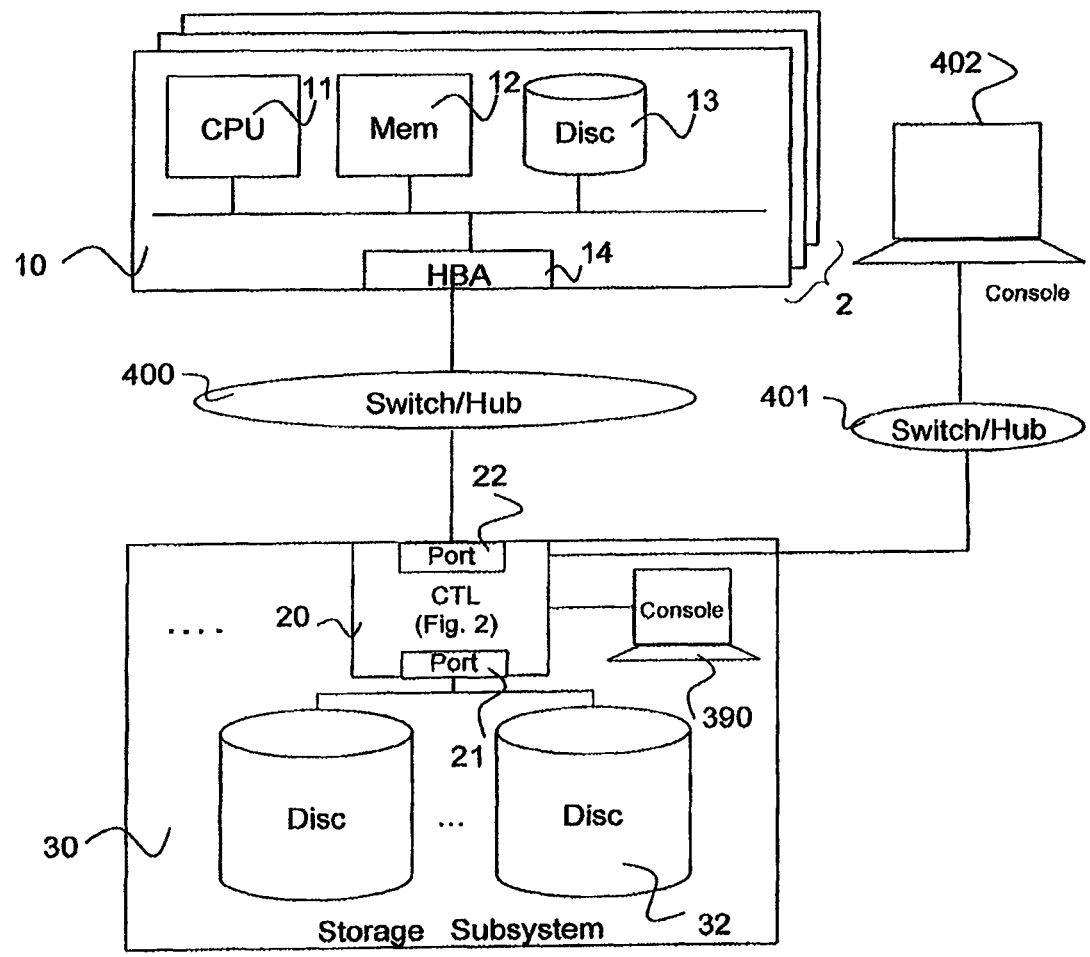
FIG. 1 is a block diagram showing a configuration of a computer system to which a first embodiment of the present invention is applied.

FIG. 1 shows a diagram illustrating the hardware components and interconnections among the components. One or more host systems 2, each has an operating system (OS) and a hardware configuration of a conventional computer system; e.g., PC, workstation, Mini Computer or Mainframe. The host system includes a CPU 11, memory 12, and an internal disk 13. The host system further includes a host bus adapter (HBA) 14 for connection to a Fibre Channel (FC) switch 400 (or an Ethernet switch or the like). Each host system can store its data (e.g., production data created and used by applications such as a database) on a logical unit (LU) provided by a storage subsystem 30.

A console 402 is configured similarly to the host system 2, but may not be configured with an HBA. The console 402 is in communication with the storage system 30 over a suitable communication channel. For example, FIG. 1 shows that the console 402 is connected to a switch 401, which in turn is connected to the storage subsystem 30. The console provides remote administrative access to the storage subsystem, allowing a system administrator to maintain and otherwise manage the subsystem.

The storage subsystem 30 is configured to provide storage using SCSI-2,3 command sets on its LU's. The storage system comprises several RAID controllers (CTL) 20 and several physical storage devices 32. The controller 20 comprises components such as a processor, memory, and network interface cards (NICs) such as Ethernet cards or FC ports. The controller provides SAN (storage area network) capability, or can process SCSI I/O requests to provide RAID-based access to the physical storage devices 32. An initial embodiment of the present invention is based on open system using SCSI. However, it is clear that the invention can be applied to other systems; e.g., Mainframes using CKD (Count Key Data) Format.

The controller 20 typically includes non-volatile random access memory (NVRAM) and can store data to the NVRAM. The NVRAM can serve as a data cache that is protected against power failures using battery protection for memory. In case of power failure, for example, data on the NVRAM may be de-staged to a storage configuration area on the physical storage devices 32 using a backup battery as a power source. The controller can provides FC ports which have WWN (World Wide Name) to specify the target ID as SCSI world, and consists of LUN on a FC port.

A management console 390 is typically provided for the customer engineer. It can be connected to the storage subsystem internally. The console 390 provides GUI-based interface for the creation or deletion of parity groups among the physical devices 32, and interfaces related to user administrator function like the creation or deletion of logical device, of path between logical device and LU, and of path between LU and FC port.

Figure 2:
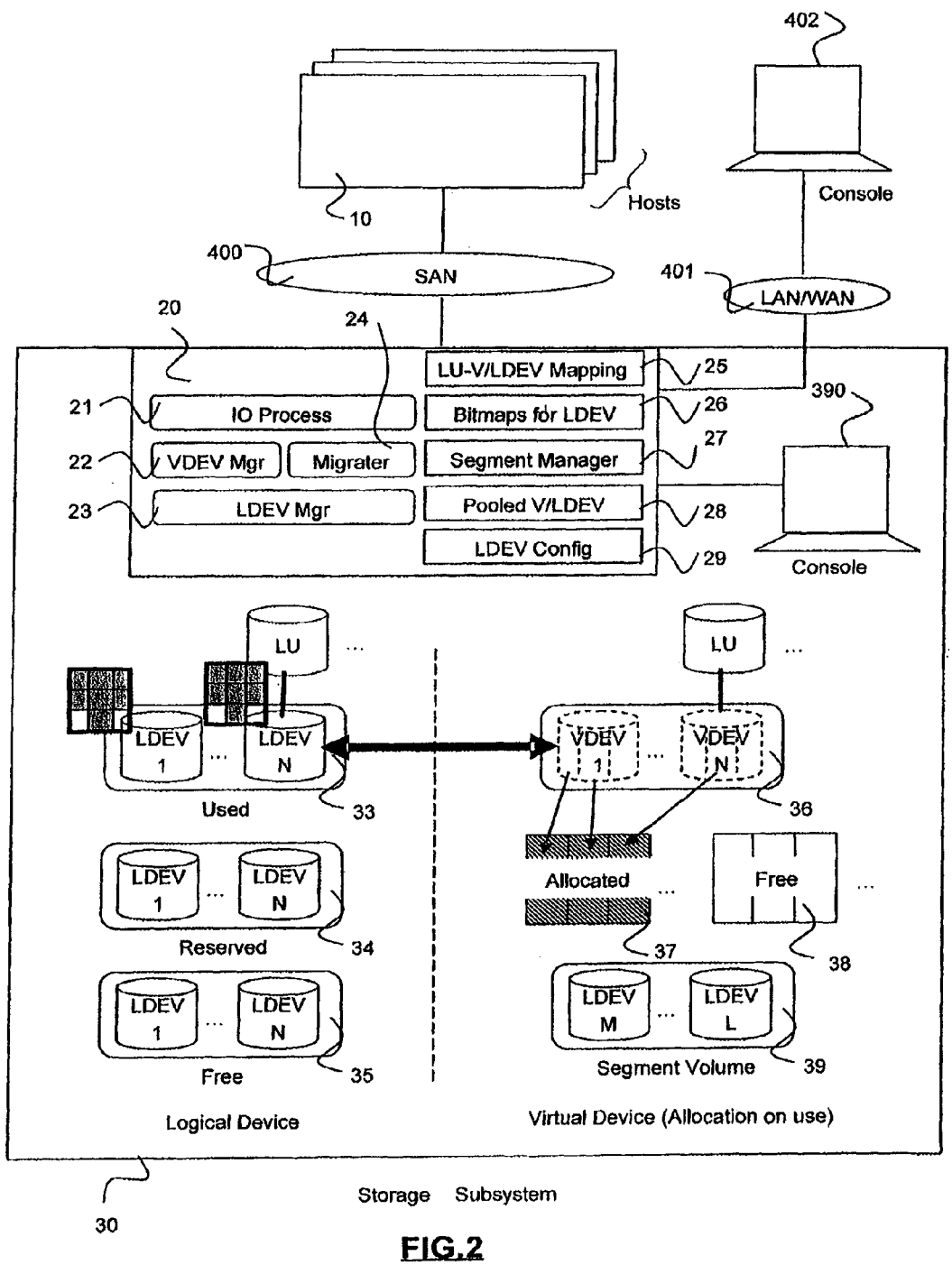
FIG. 2 shows a functional representation of the system configuration of FIG. 1.

FIG. 2 is a diagram illustrating a logical view of the software components of the system shown in FIG. 1 and the interactions among them. The SAN 400 is logical connection between a given Host 10 and Storage Subsystem 30 using a switch or Hub like FC and Ethernet. This capability is provided primarily by a fibre channel switch, a hub, an Ethernet Switch or hub, etc. The LAN/WAN 401 is logical connection between the Console 402 and Storage subsystem 30 using switches like Ethernet, FDDI, Token ring, and so on. The storage subsystem is connected to LAN/WAN 401 to access from other host to manage storage subsystem.

The storage subsystem 30 comprises various software components or modules. The functions provided by the software can be enabled in microcode that executes in the controller 20. The program code can be provided from an installation stored on optical media such as CD-ROM, or can be obtained from FD or other remote devices like an Internet connection to install microcode. The microcode comprises a conventional parity group manager (not shown), a logical device manager (LDEV Mgr) 23 that creates a logical device to provide a logical storage from physical discs to an IO process 21, a Virtual Device Manager (VDEV Mgr) 22, and a migrater 24. Details of these processes are discussed further below.

The parity group manager is known, and thus not shown in FIG. 2. This module is part of the microcode in the controller 20. The parity group manager defines and maintains parity group information for physical storage devices 32 using RAID0/1/2/3/4/5/6 technology. RAID 6, based on RAID 5 technology, provides dual parity protection. The created parity group is listed in an LDEV Config table 29 (FIG. 3). The, information in this table includes a parity group number 51 to identify the parity group within storage subsystem, a usable capacity size 52 created from RAID technology, a RAID configuration 53, and the constituent physical storage devices 54. Additional information in the table is discussed below.

The LDEV manager 23 manages the structure of each LDEV and the behavior of IO from the LU's. The LDEV presents a logical storage area for an LU to store and present data from/to host. The LDEV is part of a parity group. The administrator defines and initially formats a region of the LDEV adding the number of LDEV. The mapping between LDEV and parity group is stored in LDEV Config table 29 (FIG. 3). For each parity group (field 51 in the LDEV Config table 29), a record is maintained for each LDEV in that parity group. The record includes an LDEV number 55 which identifies the LDEV, a start Logical Block Address (LBA) 56 which represents the LDEV's start address in the parity group, and an end LBA 57 which represents the LDEV's end address in the parity group.

The data used to represent an initialized volume can be ASCII "0" (zero). However, "0" is also sometimes used as the return value in a read function call to indicate an un-assigned segment in a VDEV (discuss in later), which can create ambiguity. Therefore, another data representation can be selected, e.g., NULL (\0), as the NULL fill value in an initialized disk. This selection can be provided via the console 402. After the LDEV is initialized, the state of initialization is stored in FMT field 58 of FIG. 3. In case of the initialization, the microcode turns a format bit ON ("1") to indicate the LDEV has initialized and not yet written to; the LDEV is said to be in an "initialized state." If the bit is OFF ("0"), this indicates the LDEV has been written to and thus is no longer in the initialized state.

Each LDEV is associated with a bitmap 26. Each bit in the bitmap 26 corresponds to a block in the LDEV, and is initially set to OFF (e.g., logic "0"). When data is written to the block, the corresponding bit is set to ON (e.g., logic "1"). More generally, blocks which have been allocated to stored data for application on the host or which are used by the operating system on the host to manage a file system are referred to as production data. These blocks are referred to as allocated blocks. Data contained in blocks which are not allocated for application data and which are not used by the operating system can be referred to as non-production data. These blocks are referred to as unallocated blocks.

Where an LDEV comprises a large number of blocks, the blocks can be grouped into a smaller number of block-groups. This helps to keep the bitmap at a smaller more convenient size. For example, an LDEV might comprise $256 \times 2^{10}$ blocks, which would require a 256 kilobit bitmap. Instead, if each bit corresponds to 256 blocks, then the bitmap need only be 1 kilobit in size.

If an LDEV does not have a corresponding bitmap defined for it, a suitable process can be provided which allows a system administrator to create one. This can be requested via the Console 402. The LDEV manager 23 would read each block (or group of blocks) from the LDEV and either set the corresponding bit to OFF if the block (or group of blocks) has not been written (i.e., the data block is filled with NULLs), or set the corresponding bit to ON if the block (or at least one of the group of blocks) has been written. This aspect of the present invention is appropriate for existing storage systems (so-called legacy systems) which are not initially configured for data migration processing in accordance with the present invention.

To accommodate the bitmap, the procedure for performing a SCSI write command is modified as shown in FIG. 4. Thus, in a Step 131, data is written to the LDEV via the LU specified by start LBA and size, in response to a write command. In a step 132, the corresponding bit in the bitmap corresponding to the LDEV is set to ON. Upon the first write first to an initialized LDEV, the microcode needs to indicate the fact that the LDEV is no longer in an initialized state. Thus, in the case of the first of SCSI write command for the LDEV, the microcode makes a note of this occurrence. Recall in FIG. 3, the FMT field 58 shows whether the LDEV is in the initialized state ("1") or not ("0"). After the first write operation is performed on the LDEV, the FMT field 58 is changed to "0" to indicate the volume has been written to or otherwise modified, and is therefore no longer initialized. As will be explained below, this FMT field 58 is used on migration for empty data from VDEV to LDEV.

The Virtual Device (VDEV) Manager 22 creates and manages thin-provisioned volumes as virtual devices to provide LUs that are based on virtual devices. When a write operation to a virtual-device-based LU requires the allocation of another block, the VDEV manager 22 allocates a storage segment from a segment pool 27-1 (see FIG. 6). The segment manager 27 manages the segment pool 27-1.

A storage segment is either "allocated" or "not allocated". FIG. 2 shows "allocated" segments 37 and "not allocated" segments 38. An allocated segment contains data. The VDEV manager 22 maintains an allocation table 27-0 (FIG. 5) to manage the Virtual LBA (VLBA) space for the virtual device that are defined by the thin provisioned volumes. The allocation table 27-0 includes a VDEV number field 141 which identifies the virtual device. A host visible size field 142 can be initialized using the SCSI's READ Capacity command. The allocation table 27-0 also stores a record for each storage segment that is allocated to a virtual device. Each record includes a start VLBA field 143 which indicates starting address in the virtual device that the storage segment represents, a Segment Size field 144 which indicates the size of each segment, and a Segment number field 145 which identifies the storage segment in the segment pool 27-1. If a segment does not contain data (i.e., has not been written to), then the Segment number field will be some undefined value that indicates the segment has not been written and thus not yet allocated; e.g., "−1".

The "not allocated" segments (or "free" segments) are created from one or more LDEVs. Each LDEV is divided into a plurality of segments and added to the free segment pool 27-1. The free segment pool comprises a segment number field 146 which uniquely identifies the segment among all of the segments; this typically is simply a sequential numbering of the segments comprising the LDEV. An LDEV field 147 identifies the LDEV from which a particular segment originates. The LBA field 148 and Segment Size field 149 identify the location of a segment in the LDEV.

Figure 7:
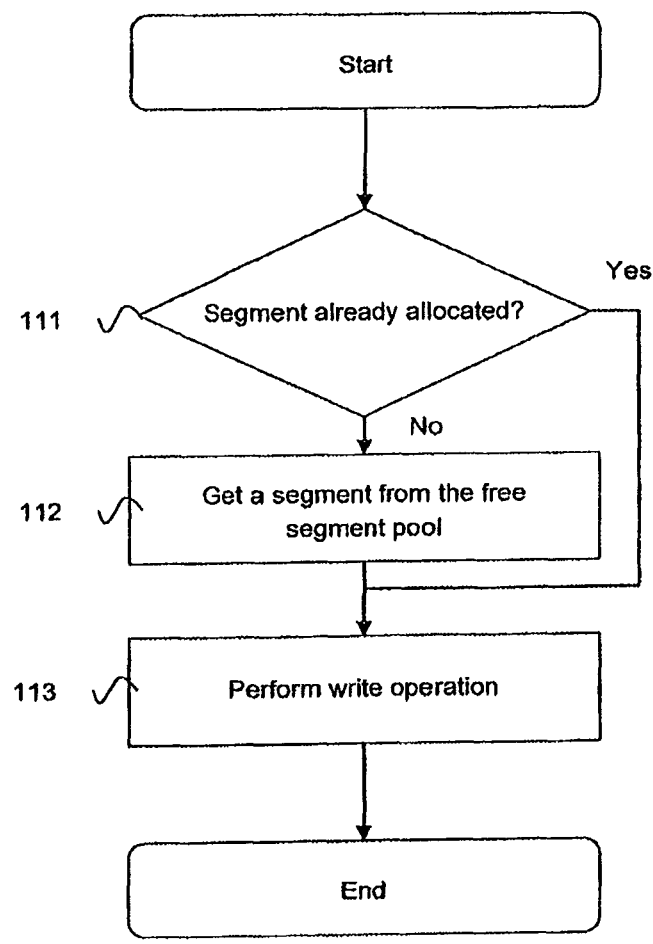
FIG. 7 shows the processing for a write operation on a thin provisioned volume.

FIG. 7 shows the processing for performing a write operation on a virtual-device-based LU. In a step 111, a determination is made whether the target of the write operation has been allocated a storage segment or not. If not then the process continues at a Step 112, otherwise processing proceeds to a Step 113. At Step 112, a storage segment is allocated from the free segment pool 27-1. Then in Step 113 the write operation is performed.

Step 111 involves an inspection of the allocation table 27-0 (FIG. 5). The entry for the virtual device (VDEV) that corresponds to the LU is consulted. The target address of the write operation is used to search the VLBA field 143. If the Segment number field 145 is not filled in (e.g., set to "−1"), then a storage segment has not yet been allocated.

An important aspect of this thin provisioning aspect of the present invention is that the thin provisioned volume is dynamically expanded as storage is needed, and that the expansion occurs automatically without user involvement.

Figure 8:
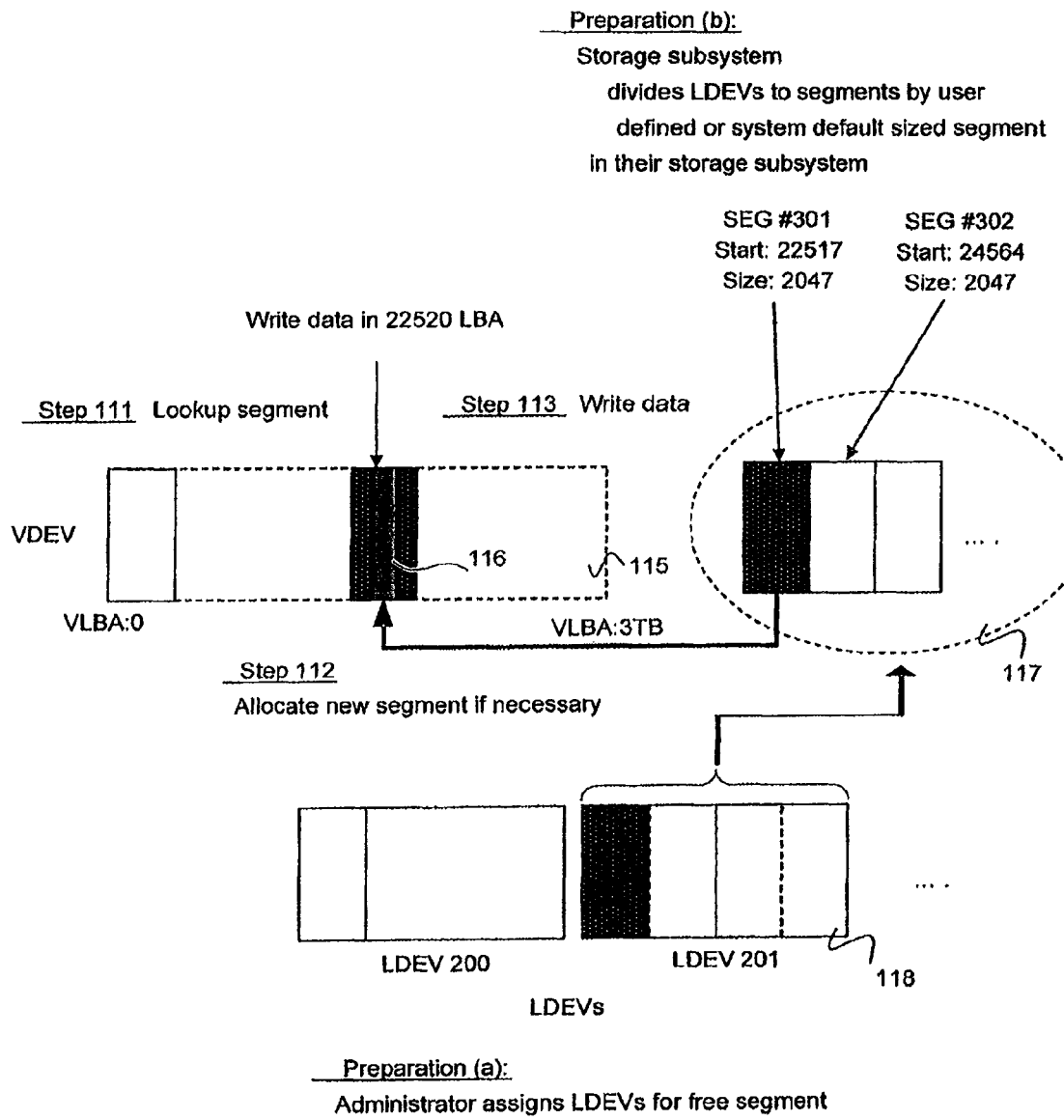
FIG. 8 shows the data flow during a write operation in an LDEV.

FIG. 8 illustrates the processing of the flowchart of FIG. 7. For example, a write operation issues for VDEV 115, targeting LBA 22520 in the VDEV. Assuming the storage segment 116 corresponding to the target address of 22520 has not yet been allocated, the VDEV manager 22 allocates a segment (#301) from the free segment pool 117. FIG. 8 also shows an underlying LDEVs 201 that is configured to implement the free segment pool. The LDEV 201 is partitioned into appropriately sized segments. Each of the segments is numbered and listed in the table 27-1 (FIG. 6) and thus collectively constitute the free segment pool 117.

Figure 9:
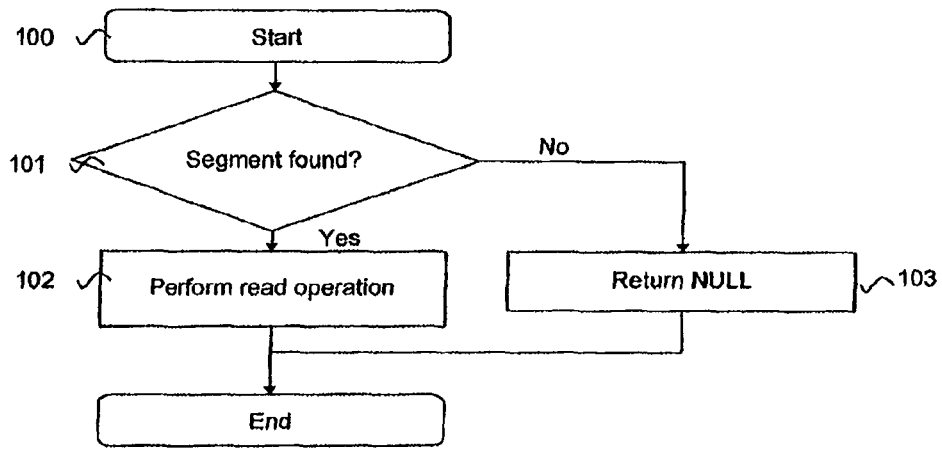
FIG. 9 shows the processing for a read operation on a thin provisioned volume.
Figure 10:
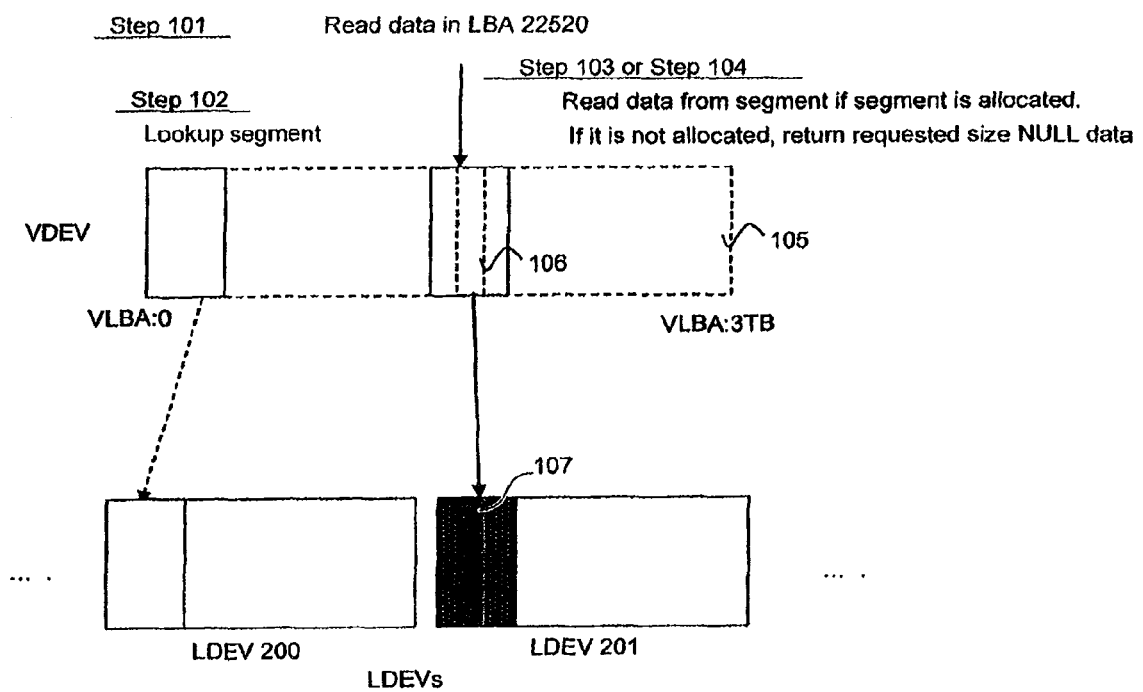
FIG. 10 shows the data flow of a read operation on a thin provisioned volume.

FIG. 9 shows the actions performed for a read operation. FIG. 10 illustrates the processing of FIG. 9. Thus, in a Step 101, a determination is made whether the storage segment that corresponds to the target LBA of the read operation has been allocated or not. If not, then in a Step 103, a suitable NULL response is returned indicating that the target LBA is an unwritten area in storage. Typically, the response includes the amount of data read, which in this case is zero. The value is defined in Console 42 when the LDEV is initialized. On the other hand, if the target LBA falls within the address range of an allocated storage segment, then the data in the storage segment is read out and returned, Step 102.

The determination made in Step 101 is made by consulting the allocation table 27-0. First, the VDEV that corresponds to the accessed LU is determined, thus identifying the correct entry in the VDEV field 141. The target LBA is compared to the start VLBA fields 143 of the corresponding VDEV to identify the corresponding storage segment. The Segment number field 145 is then consulted to determine if the segment has been allocated or not; processing then proceeds to Step 102 or Step 103 accordingly.

FIG. 10 shows the situation where the target LBA accesses a previously allocated storage segment. A read request is shown targeting LBA 22520 which maps (via allocation table 27-0) to segment 106. Segment 106 is shown to reside on LDEV 201 at the block location 107. The actual data for the read operation is then read from LDEV 201.

The IO process 21 processes IO requests made to an LU from a host. The IO process 21 comprises a component (not shown) for handling SCSI I/O operations. The IO process includes a table 25 (FIG. 12) that maps LUs to ports in the storage subsystem 30. The table 25 is used by the controller 20 to coordinate information between ports and LUs. The table includes a port number field 81 to identify the physical FC port, a WWN field 82 which associates the world wide name (WWN) to the port, a logical unit number (LUN) field 83, and a device name field 84.

The Migrater 24 performs migration operations to move data between LDEVs and VDEVs according to the present invention. The migration operations include migrating data between LDEVs, migrating data from an LDEV to a VDEV, migrating data from a VDEV to an LDEV, and migrating data between VDEVs.

In the migration of data from a first LDEV to a second LDEV, the administrator specifies an LU as the source LDEV and he selects a target LDEV. The target LDEV is selected from the free LDEV pool 173 (FIG. 11) via a suitable interface provided on console 390 or console 402. The free LDEV pool 173 shows the change in state for each LDEV. There are three states: One state is "Used LDEV" 172 which indicates those LDEVs that been assigned to an LU or to a free segment pool 27-1 (as discussed above, and discussed further below). Another state is "Free LDEV" 173 which indicates those LDEVs that are not assigned to an LU or to a free segment pool 27-1. The final state is "Reserved LDEV" 174 which indicates those LDEVs in an intermediate state of operation. More specifically, these LDEVs are those which had been allocated for a migration operation which is still in progress.

The Migrater 24 can schedule a task to reserve the target LDEV and to perform the migration operation. When the migration task executes, the Migrater 24 creates a pair of mirror between the source LDEV and the target LDEV. During mirroring, the host's write IO is sent to the source LDEV and to the target LDEV, setting bits in the associated bitmap that correspond to blocks written on the target LDEV and the block of copy for the host written block which have already written by host is skip. If migration is performed in an "online" manner, then the Migrater 24 suspends hosts IO directed to the source LDEV after completion of the mirror operation, and splits the mirror pair. The Migrater 24 then changes the LU designation that is used by the host to point to the target LDEV. The source LDEV then becomes a free LDEV. If migration is performed in an "offline" manner, then the Migrater 24 simply continues to process IOs for the source LDEV upon completion of the data migration. Performing "offline" migration allows the administrator to re-use the target LDEV; e.g., connecting it to another LU, or the LU may have been already assigned to and LDEV before the mirror operation.

Figures 11, 12, 13:
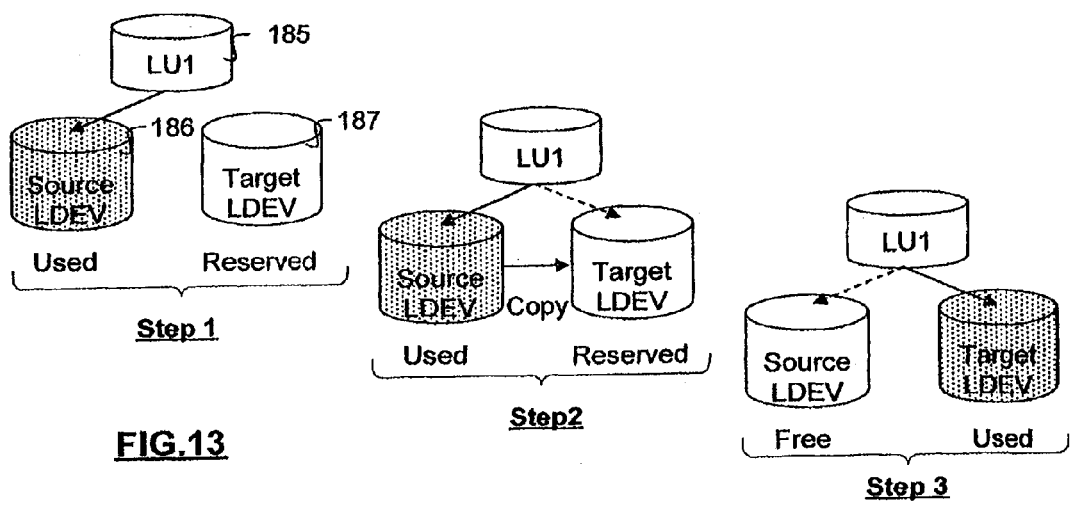
FIG. 11 shows a table of free LDEV's.
FIG. 12 shows configuration information for defined LDEV's.
FIG. 13 shows state changes during a migration from LDEV to LDEV.

FIG. 13 shows the operation of the change state on migration. In Step 1, the Migrater 24 reserves a target LDEV 187 and enters a migration task to the scheduler. Then in Step 2, the scheduler invokes the task and starts to migrate data from used LDEV 186. This includes mirroring data from the source LDEV to the reserved LDEV which is the target LDEV 187. Of course, during the mirroring, the host's write IO is sent to source LDEV and to the target LDEV. If migration is on-line, source IO is suspended and path is changed to target LDEV. After the mirroring, target LDEV is changed to a used LDEV state and the source LDEV is changed to a Free LDEV state in Step 3.

To migrate data from one VDEV to another VDEV, the administrator specifies a target LU on the console. To ensure that the data migration occurs properly, there is the idea of a VDEV number. The controller 20 has a table of Pooled VDEV 28-1 (FIG. 14) to manage the state of the VDEVs. The table includes a "Used" VDEV number field 475 that shows the VDEVs which have already been assigned to an LU, a "Reserved" VDEV field 476 that shows the VDEV number of the target VDEV that has been reserved for the migration operation, and a "Free" VDEV field 477 that shows VDEVs which have not been assigned to an LU.

During a migration operation, Migrater 24 on storage subsystem 30 picks a free VDEV from the Free VDEV field 477 in the VDEV pool 28-1, and move the VDEV number of the selected VDEV to the Reserved VDEV field 476. A migration task is then created and scheduled. The migration task is executed as shown in Step 1 in FIG. 15.

Figures 14, 15:
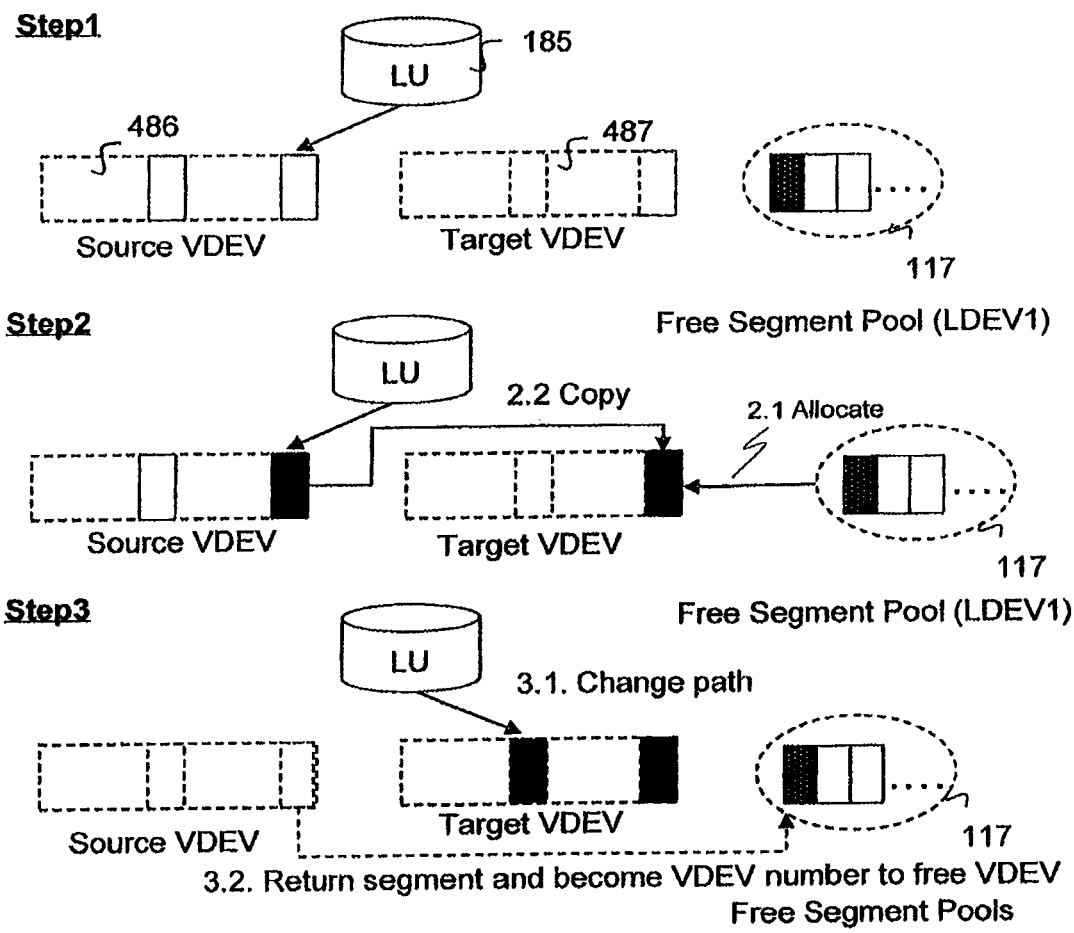
FIG. 14 shows a table of pooled VDEV's.
FIG. 15 shows the flow for a migration operation between two VDEV's.

When task is executed, Migrater 24 allocates a new storage segment (Step 2.1 in FIG. 15) and copies data by each segment from segment on source VDEV to the new segment on target VDEV (Step 2.2 in FIG. 15). Of course during the copying, the host's write IO is sent to source VDEV and to the target VDEV to also write data on target VDEV. If migration is performed in an "online" manner, then the host will be "connected" to the target VDEV upon completion of the migration. The Migrater 24 suspends the host's IOs after completing copying of all the segments from the source VDEV to the target VDEV. The LU designation that is used by the host to access the volume is changed to point to the target VDEV (Step 3.1 in FIG. 15). The VDEV number of the target is moved from the Reserved VDEV field 476 (FIG. 14) to the Used VDEV field 475. The segments in the source VDEV are put into the free segment pool 117 and the source VDEV number is moved to the Free VDEV 477 field 477 (Step 3.2 in FIG. 15). If migration is performed in an "offline" mode, then the Migrater 24 continues to process IOs using the source VDEV. The administrator can re-use the target VDEV after split of the pair and assigning an LU to a VDEV or the LU may have been assigned to the VDEV before the copy in the case of OFFLINE operation; Step 1 in FIG. 15.

The scheduler that is used to schedule the migration tasks is typically provided by the OS. For example, the "cron" utility is provided on UNIX-based OSs. The Windows® operating system from Microsoft also provides for task scheduling. As mentioned, user access to schedule and otherwise monitor migrations tasks can be provided by the console 390 in the storage subsystem 30, or remotely via the console 402.

Typical operation of the present invention involves a user (e.g., a customer service engineer) creating a parity group from among the physical storage devices 32. Next, a system administrator creates a plurality of LDEVs from the parity group. The administrator assigns at least one of the LDEVs to the free segment pool. The storage subsystem 30 then divides the LDEV, according to predetermined segment size criteria, into a plurality of segments which constitute the free segment pool. To create a VDEV, the administrator picks a VDEV number from VDEV number pool 477 in FIG. 14 and a size for the VDEV. To access an LU from the host, the administrator defines a path between the VDEV or LDEV and the LU.

A migration operation of date from an LDEV to a VDEV requires that at least one LDEV is associated with an LU. The free segment pool must have free segments for allocation. There must be an available VDEV in the VDEV pool 477 (FIG. 14) for allocation. Similarly, a migration operation of data from a VDEV to an LDEV requires a VDEV that is associated with an LU. A free LDEV from the LDEV pool 173 (FIG. 11) must be available for allocation.

Before migration commences, the administrator needs to know which LDEV or VDEV is best to use and must create a task in the scheduler to initiate the migration process.

The basic logic is that the storage subsystem performs scheduled checks of the rate of written data to an LU comprising VDEVs or to an LU comprising LDEVs on a storage subsystem, e.g., on a monthly basis, quarterly, or the like. The storage subsystem checks the rate of the allocated segment among the segments in the VDEV and checks turned-on bits in the bitmap for the LDEV (indicating that the corresponding segment for LDEV was modified since the initial format of the LDEV).

Figure 16:
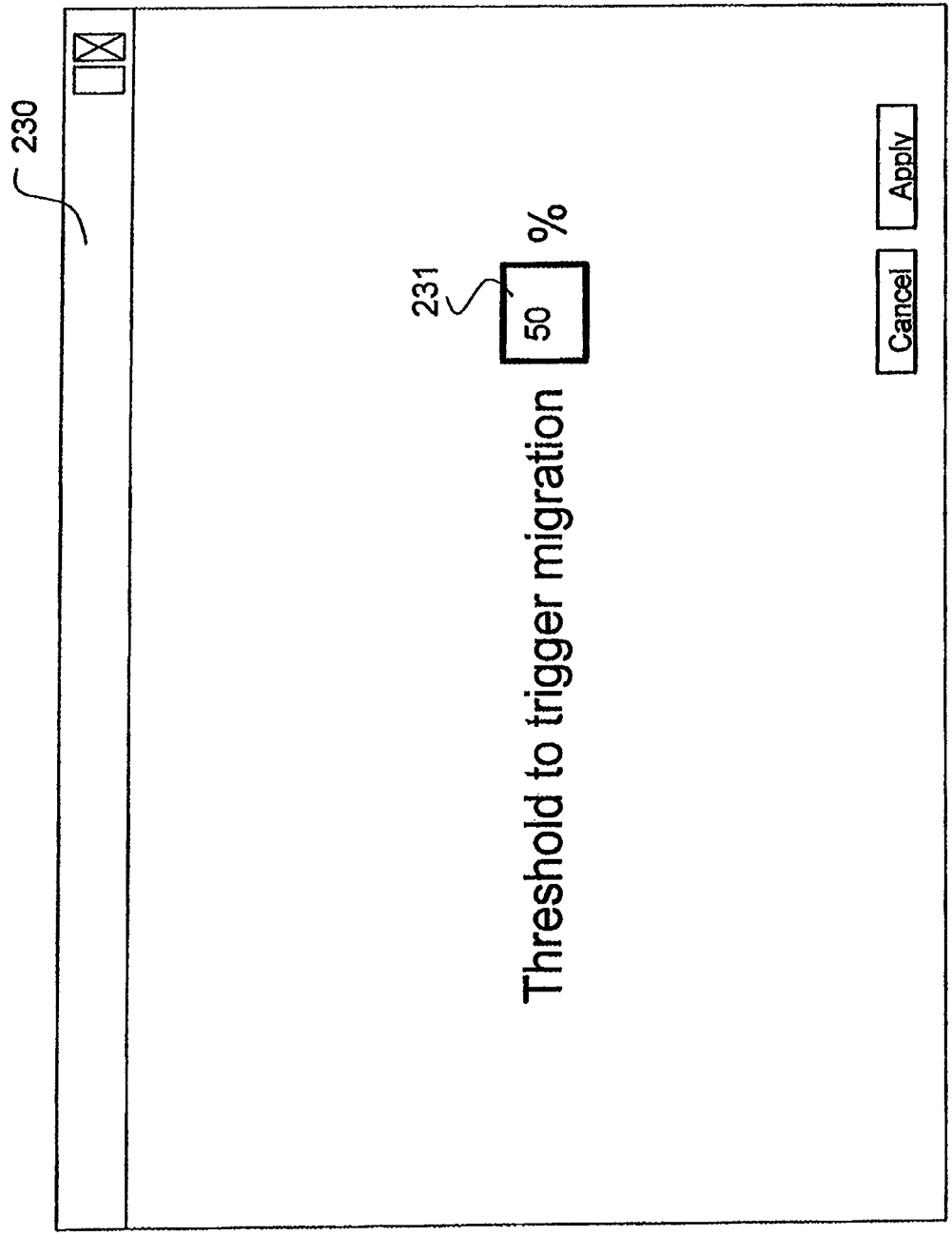
FIG. 16 shows a user interface for setting migration thresholds.

FIG. 16 shows a graphical interface that can be used to set a threshold 231 (more generally a criterion) for activating the migration process. In the example shown, the value entered in the field 231 represents the percentage utilization of an LU that will trigger a migration. For example suppose the value is 50%, and suppose the LU is initially associated with an LDEV. If the amount of storage used on the LDEV falls below 50%, then this will trigger a migration of data from the LDEV to a VDEV, where the LU is then associated with the VDEV after the migration. If later the usage of the LU (now associated with a VDEV) rises above 50%, then this could trigger a migration of the data back to an LDEV, when the LU is then associated with the LDEV. The GUI shown in FIG. 16 can include a field (not show) that specifies how often to perform a check of the usage level of the LDEV or VDEV that the LU is currently associated with.

Since data migration is a large undertaking, it may be more practical to simply recommend to the system administrator that a migration operation is indicated for an LU, rather than autonomously performing the migration. The system administrator can make the final decision based on the recommendation.

Figure 17:
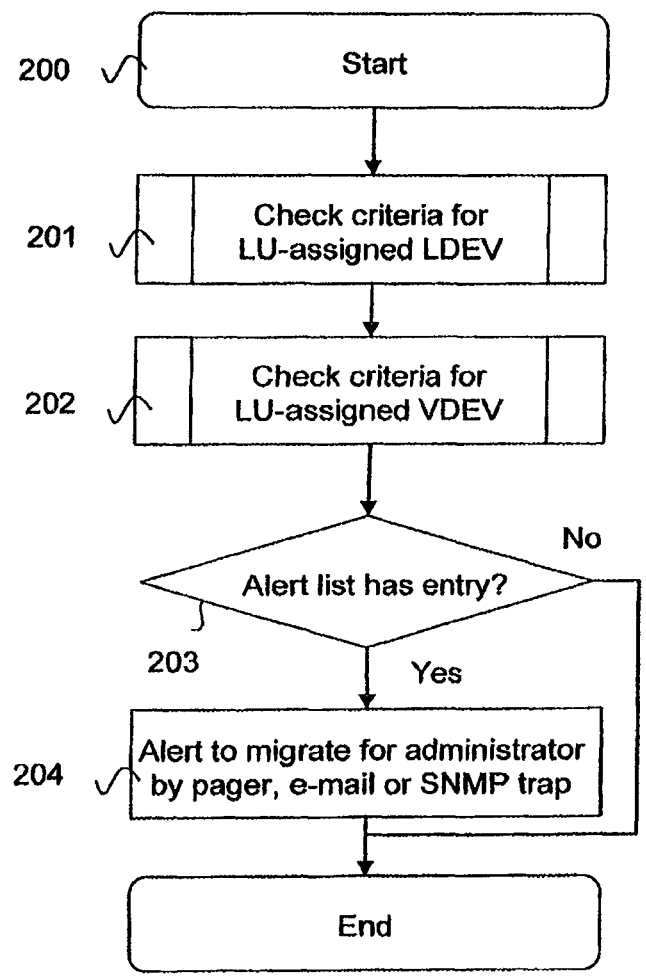
FIG. 17 illustrates triggering of migration.

FIG. 17 shows the processing by which a migration is triggered. This process can be periodically performed at a predetermined rate, or according to a schedule; either of which can be user-specified. In a step 201, a check is made whether the criteria for migrating data from an LDEV to a VDEV has been met. This is discussed in further detail in FIG. 18. In a step 202, a check is made whether the criteria for migrating data from a VDEV to an LDEV has been met. This is discussed in further detail in FIG. 19. If there is an alert list (step 203), then each user in the alert list is notified in a step 204. The notification can be made by any of numerous ways; e.g., email, fax, pager, SNMP trap, etc. Thus, the example shown in FIG. 16 illustrates a simple criterion for deciding when to perform a migration, namely, monitoring the usage level. For discussion purposes, this simple criterion will be used as an illustrative example. It can be appreciated however, that other criteria can be readily employed.

Figure 18:
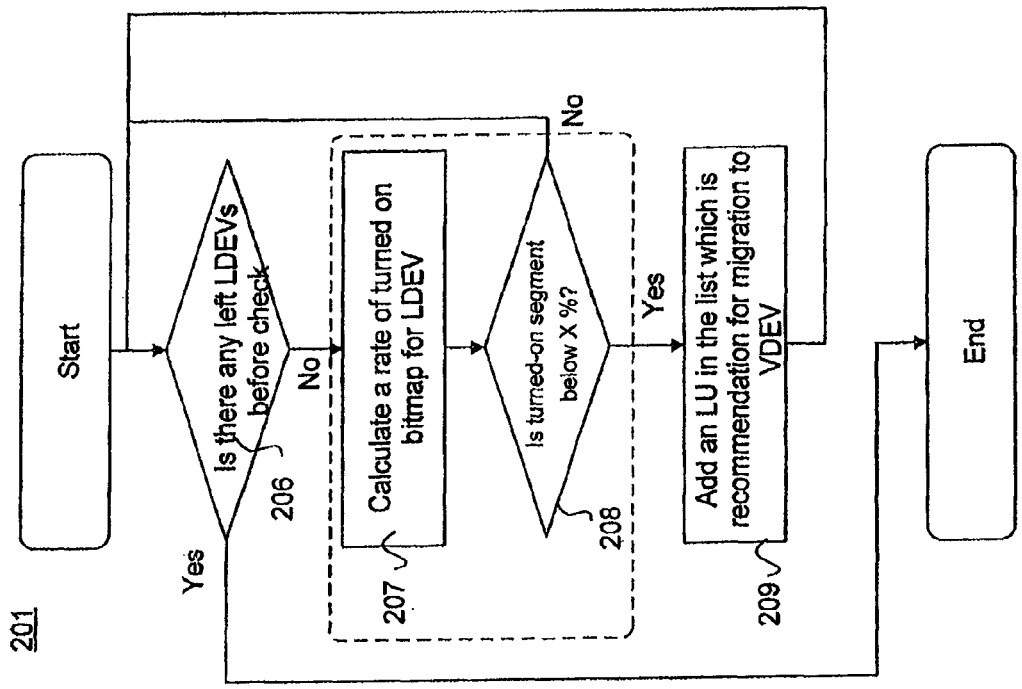
FIG. 18 shows triggering for migration from an LDEV to a VDEV.

FIG. 18 shows the processing for determining which LDEVs are migrated. In a step 206, a check is made whether each LDEV has been examined for migration. If all the LDEVs have been examined, then the process ends. Steps 207 and 208 constitute an example of a criterion (indicated by the dashed lines) for triggering migration or making a recommendation to perform a migration. Step 207 checks the number of bits that are turned on in the bitmap corresponding to the LDEV being examined. This indicates the usage level of the LDEV. For example, the usage rate might be computed as:

usage rate(LDEV)=turned on bits/total # of bits*100

In step 208, if the usage level falls below a threshold percentage (as set in FIG. 16, for example, the threshold would use a dedicated threshold for VDEV like Y independent from X. In this case, there is no suggestion of migration between X and Y threshold), then the LU that is associated with this LDEV is scheduled or recommended for data migration to a VDEV. Processing continues to step 206 to examine the next LDEV.

Figure 19:
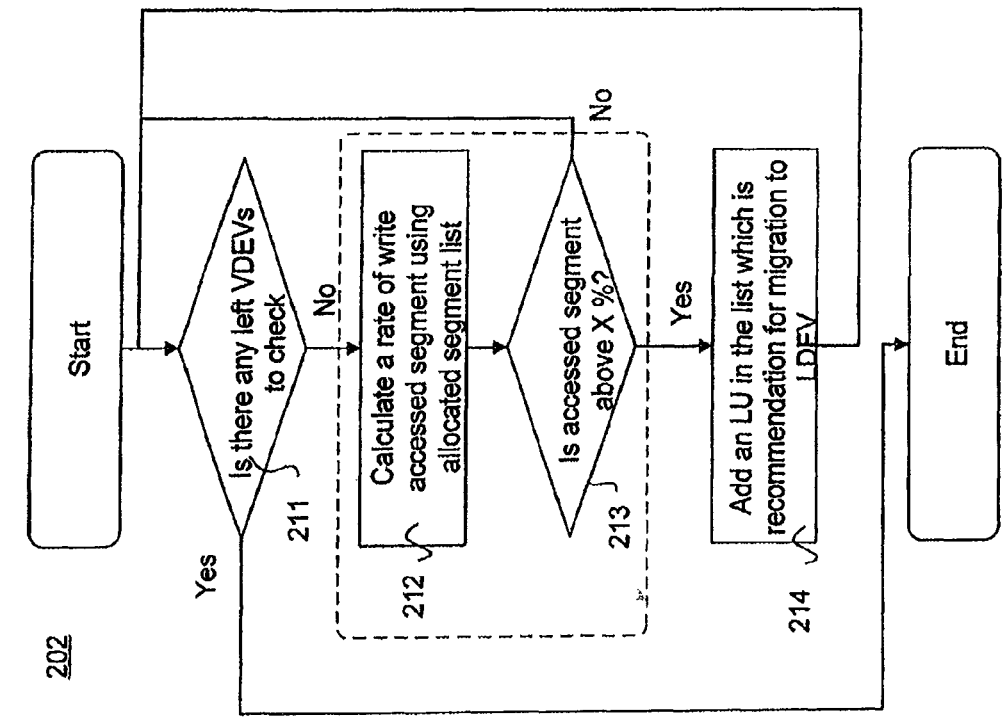
FIG. 19 shows triggering for migration from a VDEV to an LDEV.

FIG. 19 shows the processing for determining which VDEVs are migrated. In a step 211, a check is made whether each VDEV has been examined for migration. If all the VDEVs have been examined, then the process ends. Steps 212 and 213 constitute an example of a criterion (indicated by the dashed lines) for triggering migration or making a recommendation to perform a migration. Step 212 checks the number of segments that have been allocated to the VDEV being examined. This indicates the usage level of the VDEV. In step 213, if the usage level rises above a threshold percentage (as set in FIG. 16, for example), then the LU that is associated with this VDEV is scheduled or recommended for data. For example, the usage rate might be computed as:

usage rate(VDEV)=assigned segments/total # of segments*100

This indicates the usage level of the VDEV. In step 213, if the usage level rises above a threshold percentage (as set in FIG. 16, for example), then the LU that is associated with this VDEV is scheduled or recommended for data migration to an LDEV. Processing continues to step 211 to examine the next VDEV migration to an LDEV. Processing continues to step 211 to examine the next VDEV.

As another criterion for step 207/212 and step 208/213, we may use number of read/write access for an LDEV or a VDEV to determine activity in the LDEV or VDEV. Migration of data from an LDEV to a VDEV can be performed if there are too few read/write accesses to the LDEV. In the case of data from a VDEV to the LDEV, migration can be performed if there are many read and write accesses. In this operation, an Administrator defines a threshold X of the counter for migration timing of LDEV, and the threshold indicates that the VDEV migrates to LDEV. The Administrator also defines a threshold Y of the counter for VDEV and the threshold indicates that the LDEV migrates to VDEV. Each VDEV and LDEV has a counter of accessed I/O number for periodically monitoring within term like a week, a month, a quarter or a year. The counter watches each read and write IO access and increases the count until the microcode checks the recommendation like Step 208/213 after the each recommendation, the counter is reset.

As same as step 208, the microcode checks the usage level for the counter with the defined threshold. If the counter is above a threshold percentage X, the microcode code recommends to migrate data to LDEV. Also as same as step 213, the microcode checks the usage level for the counter with the defined threshold. If the counter falls below a threshold percentage Y, the microcode code recommends to migrate data to VDEV.

FIG. 20 shows an example of a GUI that lists the recommendations for migration. The interface shows a source LU field 221 which identifies the LU that contains the data that is the object of possible migration operation. A target device field 222 identifies the target of the data migration. A configuration field 223 indicates whether the device identified in the LDEV field 222 is configured as an LDEV or a VDEV. These fields are obtained from the table 25 shown in FIG. 12. A recommendation field 224 shows the results of the processing outlined in FIGS. 17-19. A usage field 225 shows amount of used space on an LDEV, or in the case of a VDEV the amount of allocated segments. In the figure, the usage is expressed as a percentage of the total available space or segments. A request migration field 226 is an input field that allows the user to select an LU for migration or not.

The GUI shown in FIG. 20 can be enhanced to allow the user to select the target LDEV or VDEV, by specifying an LDEV number in the target in the field 222. The GUI can be enhanced with a field that specifies "online" migration, meaning that when an LU has migrated it data to the target, the LU is then assigned to that target for subsequent IO.

Figure 21:
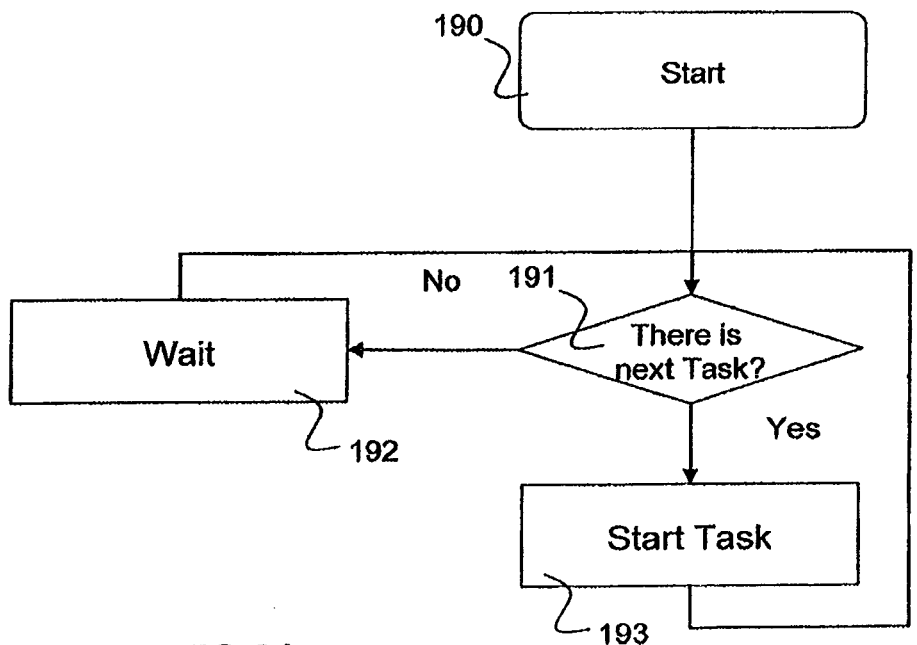
FIG. 21 shows processing performed by a scheduler.

When the Apply button is "activated" by the user via a mouse click, for example, any selected migration operations are then scheduled. FIG. 21 shows the processing performed by the scheduler. This is a standard wait loop which looks for tasks that are scheduled.

Figure 22:
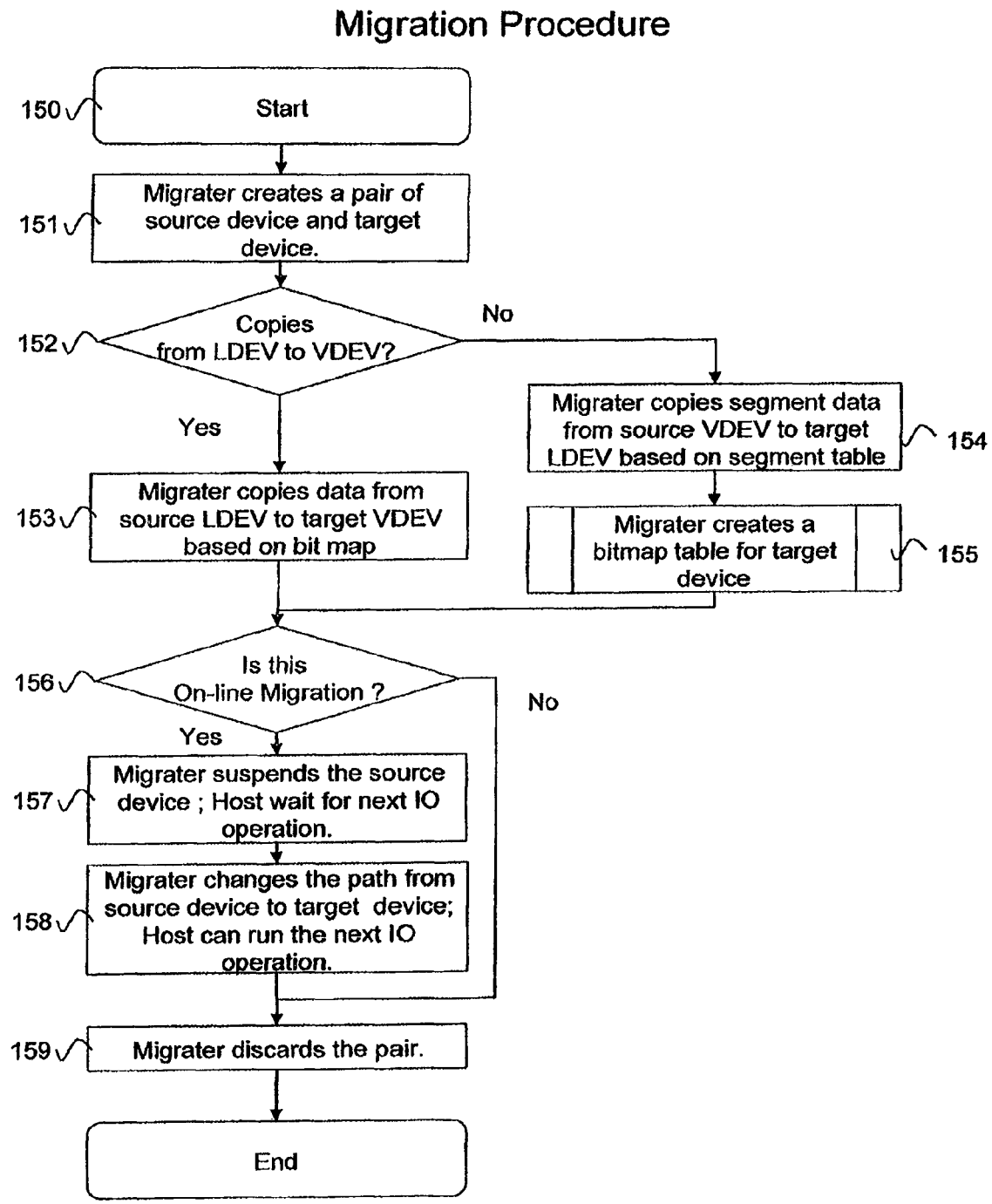
FIG. 22 shows the processing for migration operations between LDEV and VDEV.

FIG. 22 shows the processing for a migration operation 150, which comprises the following:

Step 151: The Migrater 24 creates a pair of a source device and a target device.

Step 152: A check is made on the direction of migration. If the migration is from an LDEV to a VDEV, then processing continues at Step 153. If migration is from a VDEV to an LDEV, then processing continues at Step 154.

Step 153: The Migrater 24 copies data from the source LDEV to the target VDEV based on the corresponding bitmap. The migration continues until data between the source device and the VDEV is synchronized. If a host sends a write IO to the source during the copying, the data for the write IO is also sent to the target to write data after the allocation of a segment.

Step 154: The Migrater 24 allocates segments and copies data from the source VDEV to the target LDEV based on allocated segment table 27-0 (FIG. 5). If the host sends a write IO to the source during the copying, the data for the write IO is also sent to the target to write data, turning ON the bit in the LDEV's bitmap that corresponds to the written segment. Also, the Migrater fills empty segments (shown as "−1" in the Segment field 145 in FIG. 5) in the LDEV with a fill character. Typically, the NULL fill value which is ASCII "0" (zero) or the NULL character (\0) is the same as the LDEV's formatted value to indicate an empty block. Regarding the Migrater filling empty segments in LDEV, we assume that the volume is not un-initialized by the NULL when some of the bits in the bitmap are "1". If the volume is initialized by the NULL when all of the bits in the bitmap are "0", the filling operation is skipped. This check is done before Step 154. FIG. 3 includes a FMT field 58 to indicate if the LDEV is in the initialized state ("1") or not ("0").

Step 155: The Migrater 24 creates a bitmap table for target device.

Step 156: The Migrater 24 confirms whether the migration task is an online operation or an offline operation. If the task is an online migration, this procedure goes to Step 157. If the task is an offline migration, this procedure goes to Step 159.

Step 157: The Migrater 24 suspends the source and target. If the host issues an IO operation, it will be placed in a wait state until Step 158 is performed.

Step 158: The Migrater 24 changes the path from source device to target device. The host can then resume with its IO operations.

Step 159: The Migrater 24 discards the pair.

Figure 23:
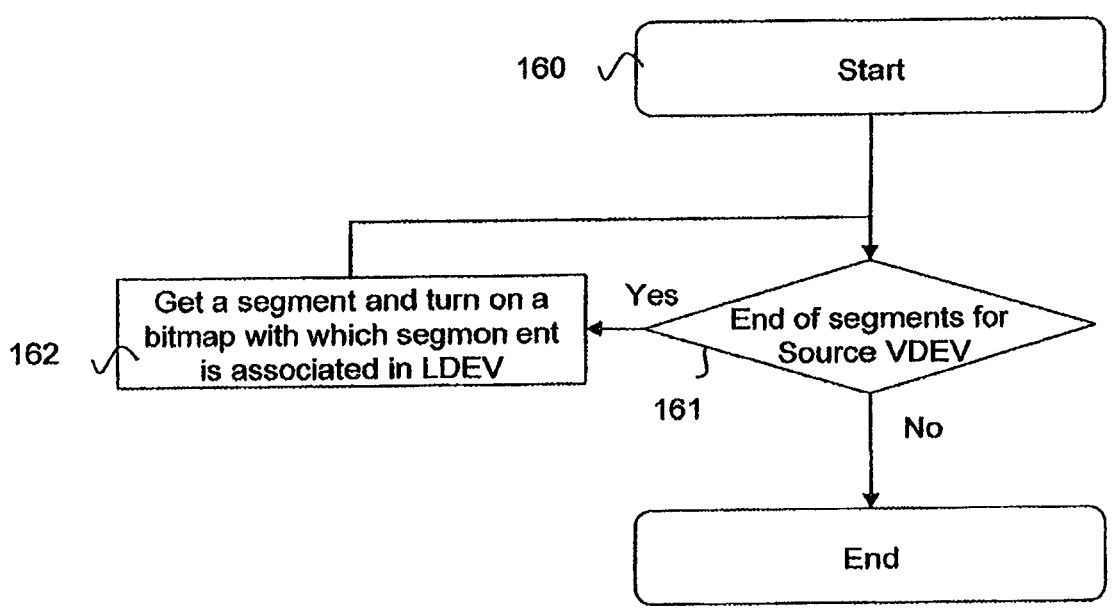
FIG. 23 shows re-creation of the bitmap for an LDEV during migration of data from a VDEV to the LDEV.

FIG. 23 shows the re-creation of a bitmap for an LDEV that was the target of a migration operation, performed in step 155 above. After the data has been copied over to the target LDEV from the source VDEV (step 161), a bitmap for the LDEV must be created. In a step 162, the Migrater 24 gets a next segment from the allocated segments and turns on the corresponding bits in the bitmap associated with the LDEV.

Figure 24:
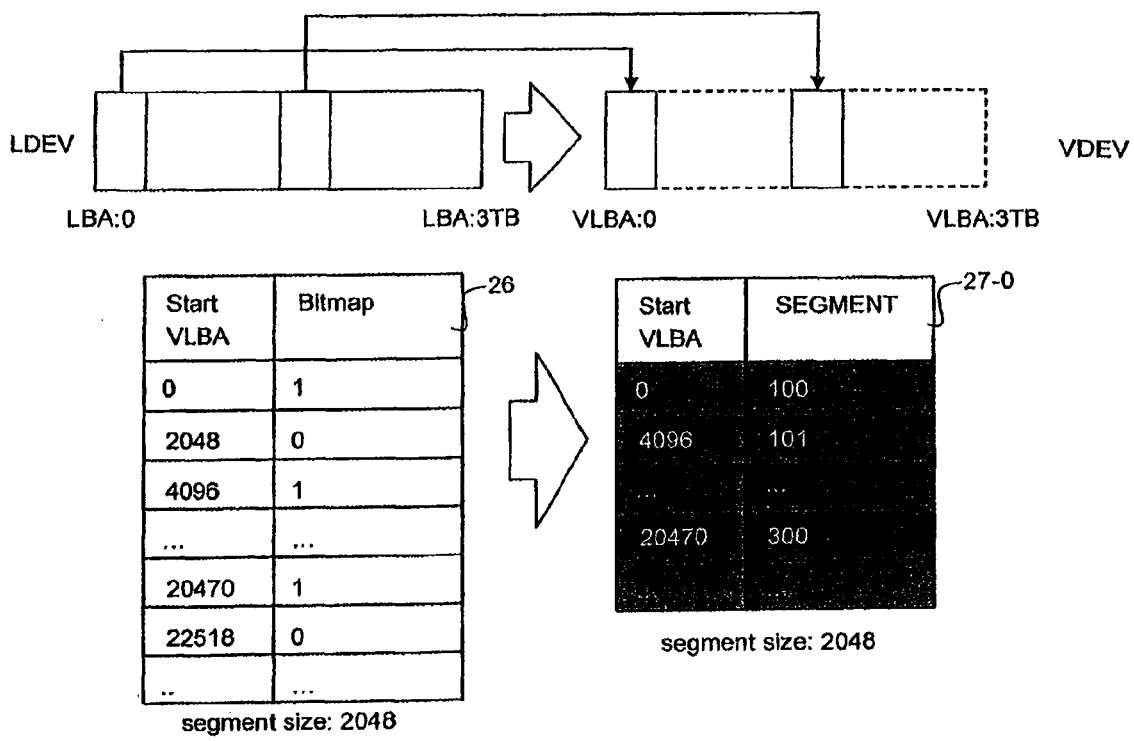
FIG. 24 shows the flow of data during a migration from an LDEV to a VDEV.

FIG. 24 shows the data flow for migration of data from an LDEV to a VDEV resulting from the migration process of FIG. 22. The Migrater 24 creates a pair relationship between the VDEV and the LDEV. Data is then copied from blocks in the source LDEV based on the bitmap table 26 corresponding to the source LDEV. Prior to the copy operation of a block of data from the LDEV, the Migrater allocates a segment from the free segment pool and creates an entry segment in the allocated segment table 27-0 associated with the VDEV. The block of data from the LDEV is then copied to the allocated segment in the VDEV. When the migration is complete the LDEV can be re-assigned to another LU. The VDEV is associated with the LU that was originally associated with the LDEV in the ONLINE case or is associated with the another LU in case of OFFLINE operation.

Figure 25:
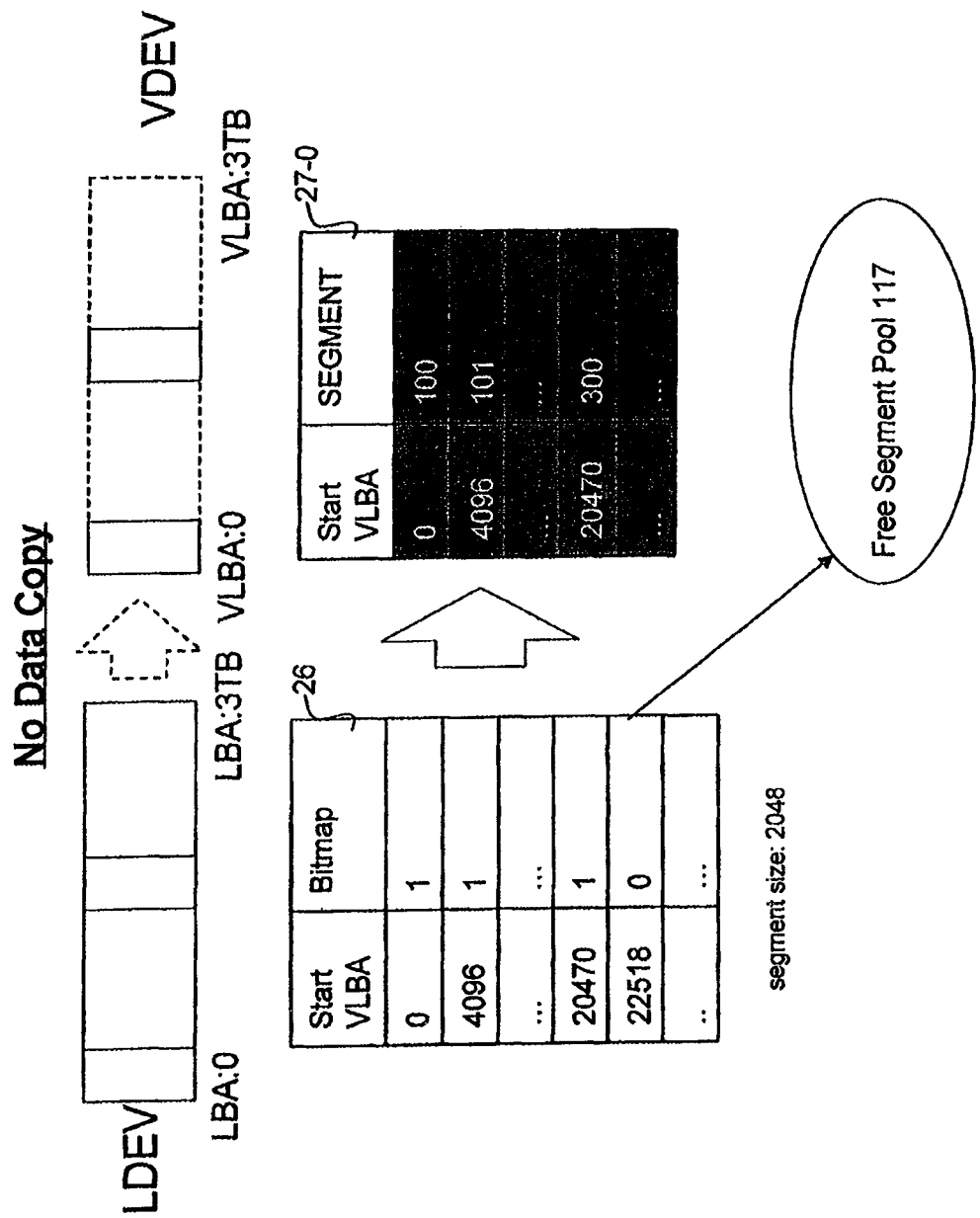
FIG. 25 shows the flow of data during a migration form an LDEV to a VDEV that does not involve copying data.

FIG. 25 shows an embodiment which avoids the copying of data. The source LDEV is identified by way of the LU designation associated with the LDEV. An available VDEV number is selected from the table 28-1 (FIG. 14) and thus identifies the target VDEV. Basically, the bitmap corresponding to the source LDEV is converted to the table 27-0 (FIG. 5) and the free segment pool of the target VDEV. The Migrater 24 proceeds down the bitmap associated with the target LDEV. The VDEV number gets us into a corresponding VDEV entry (field 141) of the table 27-0 (FIG. 5). For each bit that is set (i.e., ON), indicating there is data in the corresponding block, the sequence number of the corresponding block is entered into the appropriate entry in the Segment field 145 of the table 27-0, using the LBA address of the corresponding block as a key into the table 27-0. The sequence numbers of the blocks in the LDEV whose bit is not set are entered into the free segment pool 117. In this way, there is no actual copying of data from the source LDEV to the target VDEV.

Figure 26:
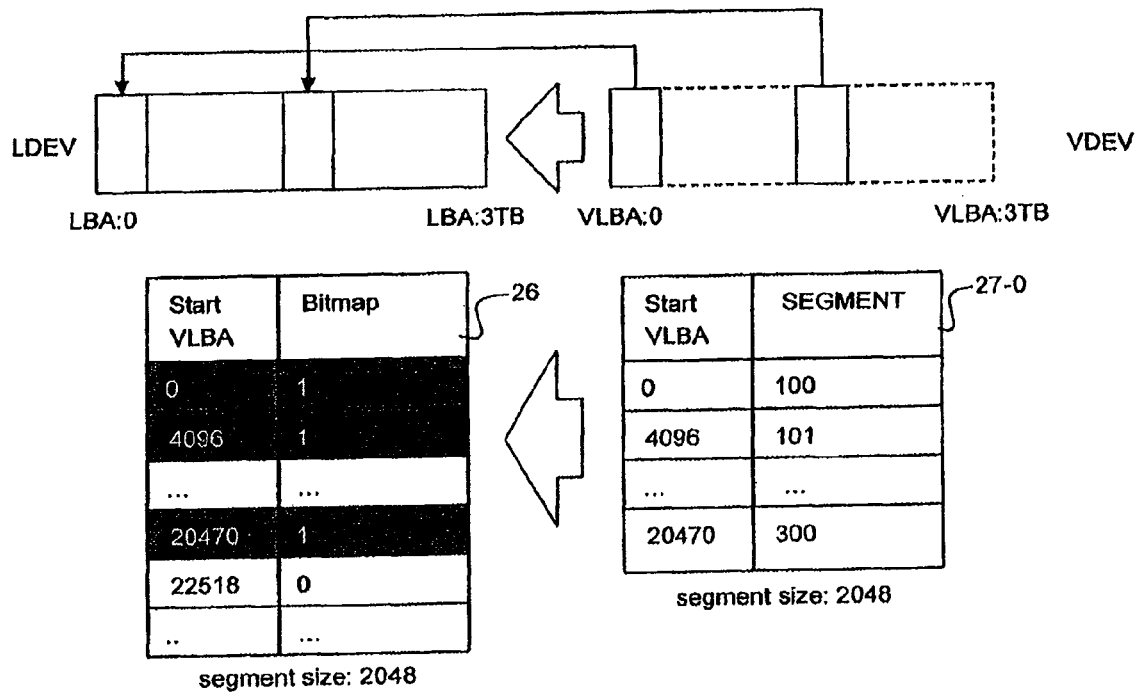
FIG. 26 shows the flow of data during a migration from a VDEV to an LDEV.

FIG. 26 shows the data movement and the creation of a bitmap for the target LDEV during a migration from a VDEV to an LDEV, as shown in the process flow of FIG. 22. A copy pair is created comprising the source VDEV and the target LDEV. Using the entry in table 27-0 (FIG. 5) that corresponds to the source VDEV, each segment in the VDEV is copied to the LDEV at the address indicated in the VLBA field 143. And if the LDEV is not formatted; the state of the FMT field 58 in FIG. 3 is "0". The microcode fills data for the segment addressed region, indicated by the Start LBA field 56 and the End LBA field 57 in FIG. 3 when the microcode encounters a "−1" value in Segment field 145 of FIG. 5.

Figure 27:
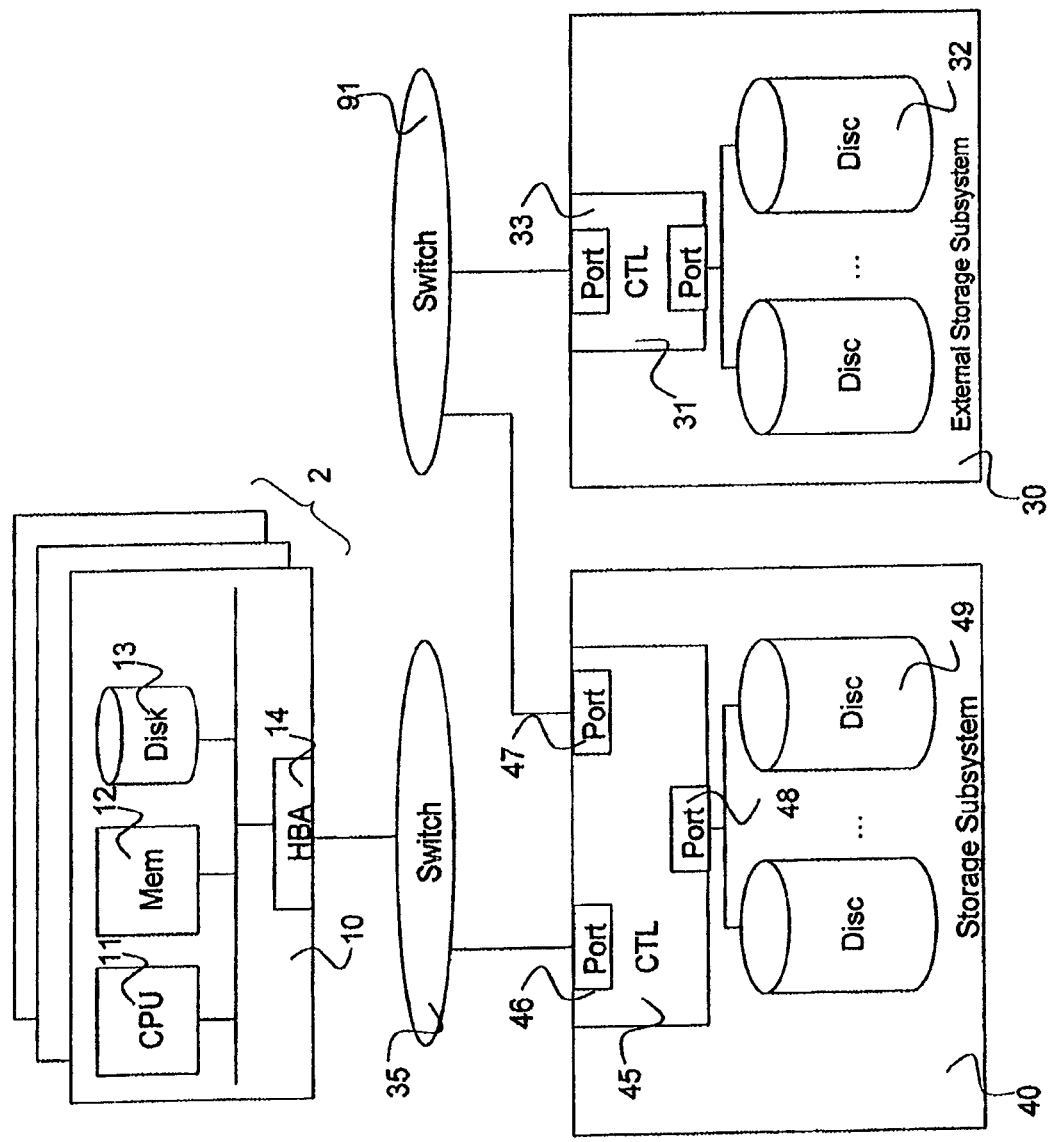
FIG. 27 shows the system configuration according to another embodiment of the present invention.

In accordance with a second embodiment of the present invention, the storage subsystems 32 (FIG. 1) are external storage systems. The benefit for this configuration is the added flexibility of using an external storage resource. FIG. 27 shows a system configuration according to this embodiment. One or more host systems 2, each has an operating system (OS) and a hardware configuration of a conventional computer system. The host system includes a CPU 11, memory 12, and an internal disk 13. The host system further includes a host bus adapter (HBA) 14 for connection to a Fibre Channel (FC) switch 35 (or an Ethernet switch or the like). Each host system can store its data (e.g., production data created and used by applications such as a database) on a logical unit (LU) provided by a storage subsystem 40.

The storage subsystem 40 is configured to provide storage using SCSI-2,3 command sets on its LUs. The storage system comprises several RAID controllers (CTL) 45 and several physical storage devices 49. The controller 45 comprises components such as a processor, memory, and network interface cards (NICs) such as Ethernet cards or FC ports (not shown). The controller provides SAN (storage area network) capability, or can process SCSI I/O requests to provide RAID-based access to the physical storage devices 49.

The controller 45 typically includes non-volatile random access memory (NVRAM) and can store data to the NVRAM. The NVRAM can serve as a data cache that is protected against power failures. In case of power failure, for example, data on the NVRAM can be de-staged to a storage configuration area on the physical storage devices 49 using a backup battery as a power source. The controller can provides FC ports (e.g., port 46) which have WWN (World Wide Name) to specify the target ID as SCSI world, and consists of LUN on a FC port. An additional port 47 is provided for connection to an external storage system 30 via a switch 91. The external storage system 30 comprises external storage devices 32.

Figure 28:
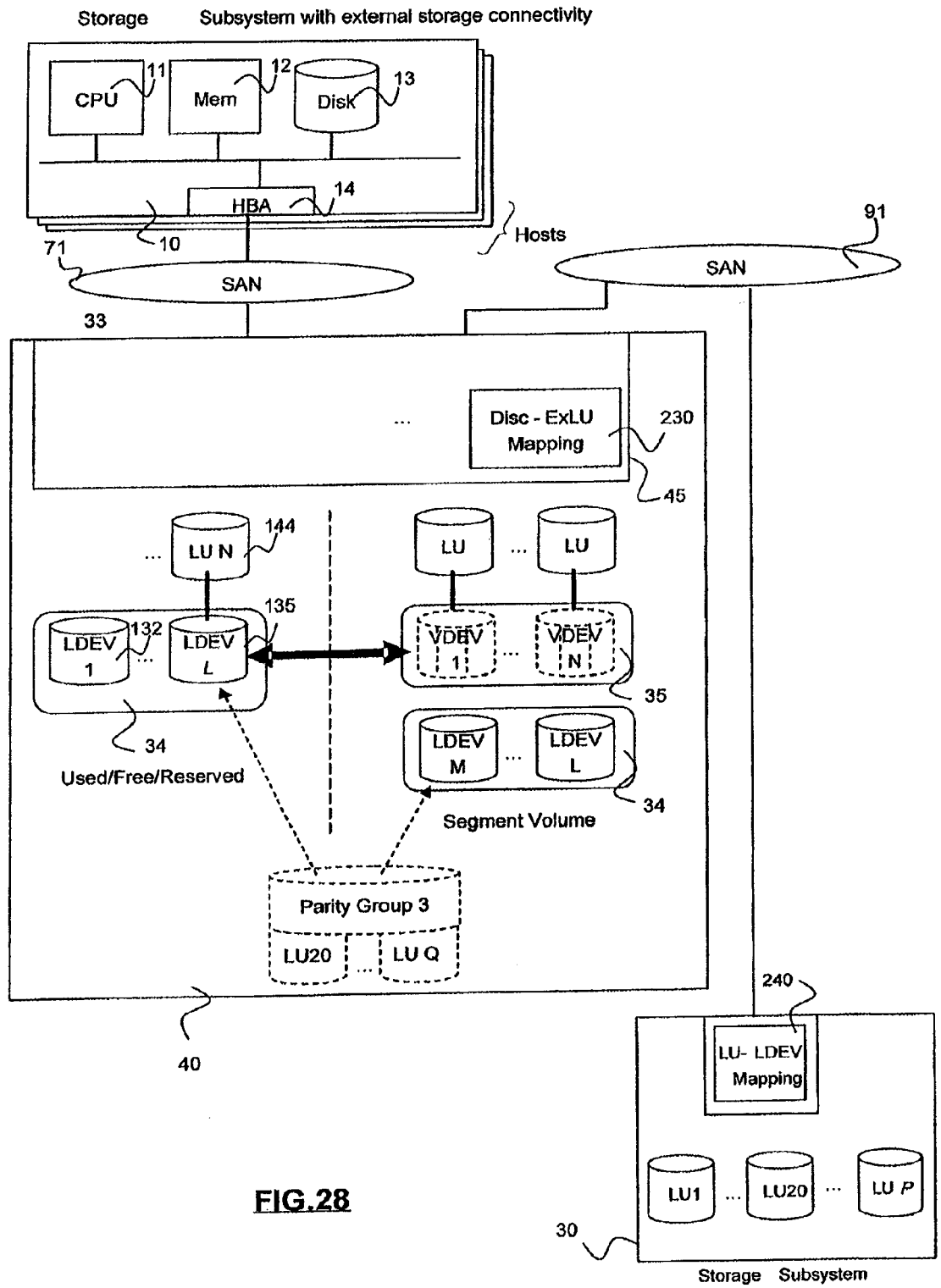
FIG. 28 shows the functional view of the configuration shown in FIG. 27.

FIG. 28 shows a functional view of the system of FIG. 27. The external storage subsystem 30 defines logical units (LUs). A mapping table 240 (FIG. 30) provides access to the internal LUs defined by storage subsystem 30 from storage subsystem 40. The mapping table includes an external LUN field 241 which contains LU numbers (LUNs) that are used by the storage subsystem 40 to access the LUs of storage subsystem 30. A Size field 242 indicates the size of the LU. A WWN field 243 stores the WWN to access an LU. An internal LUN field 244 represents the LU number used internally by the storage subsystem 30.

The storage subsystem 40 includes a Disc-External LU mapping table 230 (FIG. 29) which provides a mapping capability to see the external LUs defined on storage subsystem 30. The mapping table 230 is the same as the table shown in FIG. 3. The Disk number field 234 points to the external LU number field 241 of the mapping table 240.

Figures 29, 30, 31:
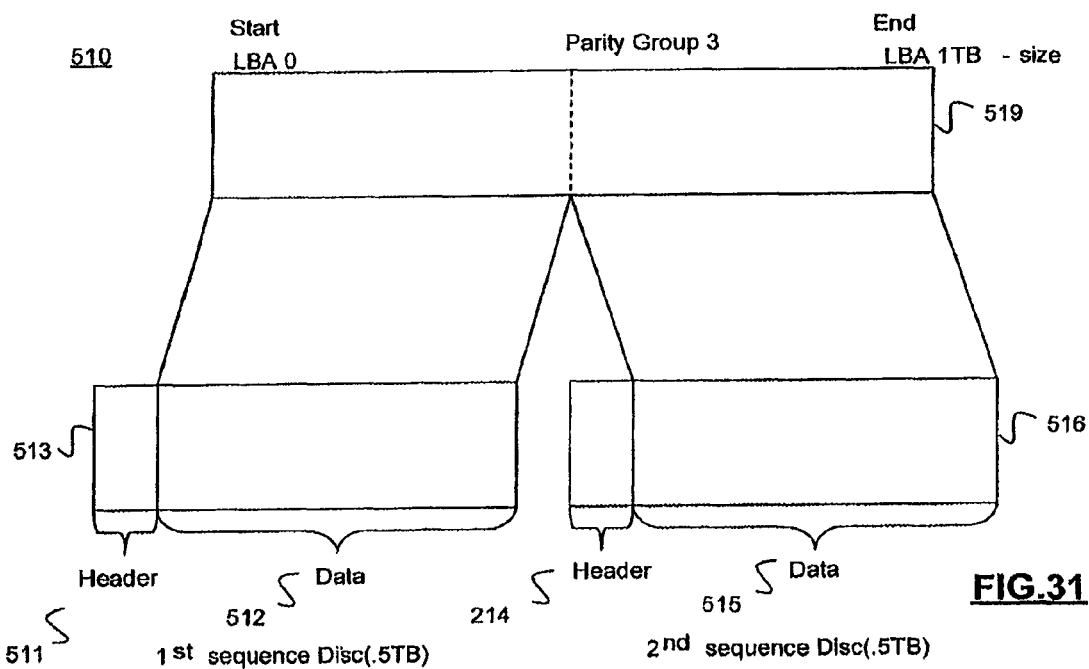
FIG. 29 shows an external mapping table for externally defined LUNs.
FIG. 30 shows a mapping from external LUN designations to internal LUN designations.
FIG. 31 illustrates an example of a parity group defined by external LUNs.

As an example of how these mappings can be used, consider the example shown in FIG. 31. A one terabyte (TB) logical unit can be defined in storage subsystem 40 comprising logical units in storage subsystem 30. Parity group 3 in mapping 230 shows such a configuration. The 1 TB LUN comprises LUNs $Ex_1$ and $Ex_2$ of storage subsystem 30. As can be seen from mapping 240, LUN $Ex_1$ is a 500 gigabyte (GB) LUN, as is LUN $Ex_2$.

The header information 511, 512 has an offset of LBA (Logical Block Address), which is the address space of LU, the unit and other functionality information for the LU is 5 MB. The 5 MB is an example of header file. We may extend the size based on new information. The header is used for data space on the parity group number, belonging parity group, size, affiliation LU (port and LUN on port), number of logical disc, configuration (concatenation, RAID0/1/2/3/4/5/6, and etc), Sequence of LU for the configuration, and Data space of which size is a total of LU size minus header for the LDEV.

The migration operation for this embodiment of the present invention is the same as discussed above. The fact that there is an external storage subsystem is hidden by the use of the external LUN mapping provided between mappings 240 and 230.

Further detail regarding the processing for thin provisioned volumes is disclosed in commonly owned U.S. Pat. No. 6,725,328 which is herein incorporated by reference in its entirety for all purposes.

What is claimed is:

1. A storage system coupled to an external storage system, the external storage system including a plurality of external storage devices on which one or more external logical volumes is created, the storage system comprising:
    a plurality of internal storage devices; and
    a controller being configured to manage a plurality of virtual volumes, and manage one or more first logical devices, in the storage system, corresponding to the plurality of internal storage devices and one or more second logical devices, in the storage system, corresponding to the one or more external logical volumes,
    the controller further being configured to:
    manage a plurality of first storage segments in the first logical devices as unallocated storage segments to at least a first virtual volume of the plurality of virtual volumes and manage a plurality of second storage segments in the second logical devices as unallocated storage segments to at least a second virtual volume of the plurality of virtual volumes, where each of the plurality of first storage segments and each of the plurality of second storage segments has the same size,
    allocate, after receiving a first write request to the first virtual volume of the plurality of virtual volumes, a first storage segment of the plurality of first storage segments in the first logical devices to the first virtual volume, and store data corresponding to the first write request to the allocated first storage segment, and
    allocate, after receiving a second write request to the second virtual volume of the plurality of virtual volumes, a second storage segment of the plurality of second storage segments in the second logical devices to the second virtual volume, and send data corresponding to the second write request to the external storage system.

2. A storage system according to claim 1, wherein each of the plurality of first storage segments and each of the plurality of second storage segments is a unit for allocating to the plurality of virtual volumes.

3. A storage system according to claim 1, wherein the controller is configured to manage a storage pool including the plurality of first storage segments and the plurality of second storage segments.

4. A storage system according to claim 1, wherein one of the second logical devices is created by using storage areas of the one or more external logical volumes.

5. A storage system coupled to an external storage system, the external storage system including a plurality of external storage devices on which one or more external logical volumes is created, the storage system comprising:

a plurality of internal storage devices; and a controller being configured to: manage a storage pool including one or more first logical devices, in the storage system, corresponding to the plurality of internal storage devices and one or more second logical devices, in the storage system, corresponding to the one or more external logical volumes; manage a first storage area of the first logical devices and a second storage area of the second logical devices as unallocated storage areas to a plurality of virtual devices which include a first virtual device and a second virtual device, where each of the first storage area and the second storage area has the same size; provide the first virtual device to which the first storage area of the first logical devices is allocated from the storage pool after receiving a first write request to the first virtual device to store data corresponding to the first write request; and provide the second virtual device to which the second storage area of the second logical devices is allocated from the storage pool after receiving a second write request to the second virtual device to send data corresponding to the second write request to the external storage system.

6. A storage system according to claim 5, wherein each of the first storage area and each of the second storage area is a unit for allocating to the plurality of virtual devices.

7. A storage system according to claim 5, wherein one of the second logical devices is created by using storage areas of the one or more external logical volumes.

8. A storage system coupled to an external storage system, the external storage system including a plurality of external storage devices on which one or more external logical volumes is created, the storage system comprising:

a plurality of internal storage devices; and a controller being configured to: manage a storage pool including a plurality of first storage segments of one or more first logical devices, in the storage system, corresponding to the plurality of internal storage devices and a plurality of second storage segments of one or more second logical devices, in the storage system, corresponding to the external logical volumes; manage at least one first storage segment of the first logical devices and at least one second storage segment of the second logical devices as unallocated storage segments to a plurality of virtual devices which include a first virtual device and a second virtual device, where each of the first storage segment and the second storage segment has the same size; provide the first virtual device to which the at least one first storage segment of the first logical devices is allocated from the storage pool after receiving a first write request to the first virtual device to store data corresponding to the first write request;

and provide the second virtual device to which the at least one second storage segment of the second logical devices is allocated from the storage pool after receiving a second write request to the second virtual device to send data corresponding to the second write request to the external storage system.

9. A storage system according to claim 8, wherein each of the plurality of the first storage segments and each of the plurality of the second storage segments is a unit for allocating to the plurality of virtual devices.

10. A storage system according to claim 8, wherein one of the second logical devices is created by using storage areas of the one or more of external logical volumes.

11. A first storage system coupled to a second storage system, the second storage system including a plurality of second storage devices on which one or more second logical volumes is created, the first storage system comprising:

a plurality of first storage devices; and a controller being configured to manage a plurality of virtual volumes, and manage one or more first logical devices, in the first storage system, corresponding to the plurality of first storage devices and one or more second logical devices, in the first storage system, corresponding to the one or more second logical volumes, the controller further being configured to:

manage a plurality of first storage segments in the first logical devices and a plurality of second storage segments in the second logical devices, where each of the plurality of first storage segments and each of the plurality of second storage segments has the same size, allocate, after receiving a first write request to a first virtual volume of the plurality of virtual volumes, a first storage segment of the plurality of first storage segments in the first logical devices to the first virtual volume, and store data corresponding to the first write request to the allocated first storage segment, and allocate, after receiving a second write request to a second virtual volume of the plurality of virtual volumes, a second storage segment of the plurality of second storage segments in the second logical devices to the second virtual volume, and send data corresponding to the second write request to the second storage system.

12. A first storage system according to claim 11, wherein each of the plurality of first storage segments and each of the plurality of second storage segments is a unit for allocating to the plurality of virtual volumes.

13. A first storage system according to claim 11, wherein the controller is configured to manage a storage pool including the plurality of first storage segments and the plurality of second storage segments.

14. A first storage system according to claim 11, wherein one of the second logical devices is created by using storage areas of the one or more second logical volumes.

15. A first storage system coupled to a second storage system, the second storage system including a plurality of second storage devices on which one or more second logical volumes is created, the storage system comprising:

a plurality of first storage devices; and a controller being configured to: manage a storage pool including one or more first logical devices, in the first storage system, corresponding to the plurality of first storage devices and one or more second logical devices, in the first storage system, corresponding to the one or more second logical volumes; manage a first storage area of the first logical devices and a second storage area of the second logical devices as unallocated storage areas to a plurality of virtual devices which include a first virtual device and a second virtual device, where each of the first storage area and the second storage area has the same size; provide the first virtual device to which the first storage area of the first logical devices is allocated from the storage pool after receiving a first write request to the first virtual device to store data corresponding to the first write request;and provide the second virtual device to which the second storage area of the second logical devices is allocated from the storage pool after receiving a second write request to the second virtual device to send data corresponding to the second write request to the second storage system.

16. A first storage system according to claim 15,
wherein each of the first storage area and each of the second storage area is a unit for allocating to the plurality of virtual devices.

17. A first storage system according to claim 15,
wherein one of the second logical devices is created by using storage areas of the one or more second logical volumes.

18. A first storage system coupled to a second storage system, the second storage system including a plurality of second storage devices on which one or more second logical volumes is created, the first storage system comprising:
a plurality of first storage devices; and
a controller being configured to manage a first virtual volume including a plurality of first virtual storage areas and a second virtual volume including a plurality of second virtual storage areas and manage one or more first logical devices, in the first storage system, corresponding to the plurality of first storage devices and one or more second logical devices, in the first storage system, corresponding to the one or more second logical volumes,
the controller further being configured to:
manage a plurality of first storage areas in the first logical devices and a plurality of second storage areas in the second logical devices, where each of the plurality of first storage areas and each of the plurality of second storage areas has the same size,
allocate, after receiving a first write request to at least one first virtual storage area of the first virtual volume, at least one first storage area of the plurality of first storage areas in the first logical devices to the at least one first virtual storage area of the first virtual volume, and store data corresponding to the first write request to the allocated at least one first storage area, and
allocate, after receiving a second write request to at least one second virtual storage area of the second virtual volume, at least one second storage area of the plurality of second storage areas in the second logical devices to the at least one second virtual storage area of the second virtual volume, and send data corresponding to the second write request to the second storage system.

19. A first storage system according to claim 18,
wherein each of the plurality of first storage areas and each of the plurality of second storage areas is a unit for allocating to the first plurality of virtual storage areas of the first virtual volume and the second plurality of virtual storage areas of the second virtual volume.

20. A first storage system according to claim 18,
wherein the controller is configured to manage a storage pool including the plurality of first storage areas and the plurality of second storage areas.

21. A first storage system according to claim 18,
wherein one of the second logical devices is created by using storage areas of the one or more second logical volumes.

22. A method for a first storage system coupled to a second storage system, the method comprising:
managing a plurality of virtual volumes;
managing one or more first logical devices, in the first storage system, corresponding to a plurality of first storage devices in the first storage system and one or more second logical devices, in the first storage system, corresponding to a plurality of second logical volumes which are provided by the second storage system;
managing a plurality of first storage segments in the first logical devices and a plurality of second storage segments in the second logical devices, where each of the plurality of first storage segments and each of the plurality of second storage segments has the same size;
allocating, after receiving a first write request to a first virtual volume of the plurality of virtual volumes, a first storage segment of the plurality of first storage segments in the first logical devices to the first virtual volume;
storing data corresponding to the first write request to the allocated first storage segment,
allocating, after receiving a second write request to a second virtual volume of the plurality of virtual volumes, a second storage segment of the plurality of second storage segments in the second logical devices to the second virtual volume; and
sending data corresponding to the second write request to the second storage system.

23. A method according to claim 22,
wherein each of the plurality of first storage segments and each of the plurality of second storage segments is a unit for allocating to the plurality of virtual volumes.

24. A method according to claim 22 further comprising,
managing a storage pool including the plurality of first storage segments and the plurality of second storage segments.

25. A method according to claim 22,
wherein one of the second logical devices is created by using storage areas of the plurality of second logical volumes.

26. A method for a first storage system coupled to a second storage system, the method comprising:
managing a first virtual volume including a plurality of first virtual storage areas and a second virtual volume including a plurality of second virtual storage areas;
managing one or more first logical devices, in the first storage system, corresponding to a plurality of first storage devices and one or more second logical devices, in the first storage system, corresponding to a plurality of second logical volumes provided by the second storage system;
managing a plurality of first storage areas in the first logical devices and a plurality of second storage areas in the second logical devices, where each of the plurality of first storage areas and each of the plurality of second storage areas has the same size; and
allocating, after receiving a first write request to at least one first virtual storage area of the first virtual volume, at least one first storage area of the plurality of first storage areas in the first logical devices to the at least one first virtual storage area of the first virtual volume;
storing data corresponding to the first write request to the allocated at least one first storage area,
allocating, after receiving a second write request to at least one second virtual storage area of the second virtual volume, at least one second storage area of the plurality of second storage areas in the second logical devices to the at least one second virtual storage area of the second virtual volume; and
sending data corresponding to the second write request to the second storage system.

27. A method according to claim 26,
wherein each of the plurality of first storage areas and each of the plurality of second storage areas is a unit for allocating to the plurality of first virtual storage areas of the first virtual volume and the plurality of second virtual storage areas of the second virtual volume.

28. A method according to claim 26 further comprising, managing a storage pool including the plurality of first storage areas and the plurality of second storage areas.

29. A method according to claim 26, wherein one of the second logical devices is created by using storage areas of the plurality of second logical volumes.

* * * * *